(12) United States Patent
Howard

(10) Patent No.: US 7,738,870 B2
(45) Date of Patent: Jun. 15, 2010

(54) SYSTEMS AND METHODS FOR INSTANT MESSAGING USING A CONTROL DEVICE

(75) Inventor: Michael L. Howard, Renton, WA (US)

(73) Assignee: Control4 Corporation, Salt Lake City, UT (US)

( * ) Notice: Subject to any disclaimer, the term of this patent is extended or adjusted under 35 U.S.C. 154(b) by 692 days.

(21) Appl. No.: 11/626,788

(22) Filed: Jan. 24, 2007

(65) Prior Publication Data

US 2008/0176562 A1  Jul. 24, 2008

(51) Int. Cl.
  *H04W 4/00*   (2009.01)
(52) U.S. Cl. .................. 455/435.1; 455/466; 709/206
(58) Field of Classification Search .............. 455/435.1, 455/466; 709/206
  See application file for complete search history.

(56) References Cited

U.S. PATENT DOCUMENTS

| | | | |
|---|---|---|---|
| 5,634,080 A | 5/1997 | Kikinis et al. | |
| 6,198,941 B1 | 3/2001 | Aho et al. | |
| 6,449,344 B1 | 9/2002 | Goldfinger et al. | |
| 2004/0142709 A1 | 7/2004 | Coskun et al. | |
| 2006/0031339 A1 | 2/2006 | Peters | |
| 2006/0271968 A1 | 11/2006 | Zellner | |
| 2008/0085728 A1* | 4/2008 | Reding et al. | 455/466 |
| 2008/0176562 A1* | 7/2008 | Howard | 455/435.1 |
| 2009/0210501 A1* | 8/2009 | Risher et al. | 709/206 |

* cited by examiner

Primary Examiner—William D Cumming
(74) Attorney, Agent, or Firm—Austin Rapp & Hardman

(57) ABSTRACT

In a method for instant messaging using a control device, a user is authenticated with an instant messenger server. A message is received. The received message includes message data from the instant messenger server. It is determined whether the message should be forwarded to the control device. If it was determined that the message should be forwarded to the control device, the received message is forwarded to the control device.

24 Claims, 17 Drawing Sheets

US 7,738,870 B2

SYSTEMS AND METHODS FOR INSTANT MESSAGING USING A CONTROL DEVICE

TECHNICAL FIELD

The present invention relates generally to computers and computer-related technology. More specifically, the present invention relates to systems and methods for instant messaging using a control device.

BACKGROUND

The price of electronic devices has continued to decrease dramatically. In addition, the types of consumer electronic components and home automation electronics that can be purchased have continued to increase. For example, DVD players, large screen TVs, multi-carousel CD and DVD players, MP3 players, video game consoles, and similar consumer electronic items have continued to drop in price and become more widely available. The decreasing prices and increasing types of consumer electronic components has packed today's homes with modern conveniences. But as these conveniences grow in number and sophistication, they also become more difficult to manage and control. In recent years, home automation systems have emerged to help manage and control the myriad devices found in modern homes.

While the home automation market continues to grow each year, past solutions typically addressed customers who build high-end custom homes or do major reconstructions on an existing home. Homeowners have needed a more affordable way to automate their existing homes without the headache and expense of major remodeling. Additionally, homeowners wanted to be able to add new products over time as they are able to afford additional technology. Home automation companies have answered the call by utilizing new wireless technologies that have significantly reduced the costs of installing automated devices in older homes as well as newly constructed homes. The desire for control of devices at a particular location is continuing to expand into retail and other non-home markets.

However, with the affordability of new technology, the number of automated devices in modern homes and other sites has continued to steadily increase. Property owners now desire more customizable systems and features in their automation systems. One of the desired customizations is the ability to send and receive instant messages throughout a site.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
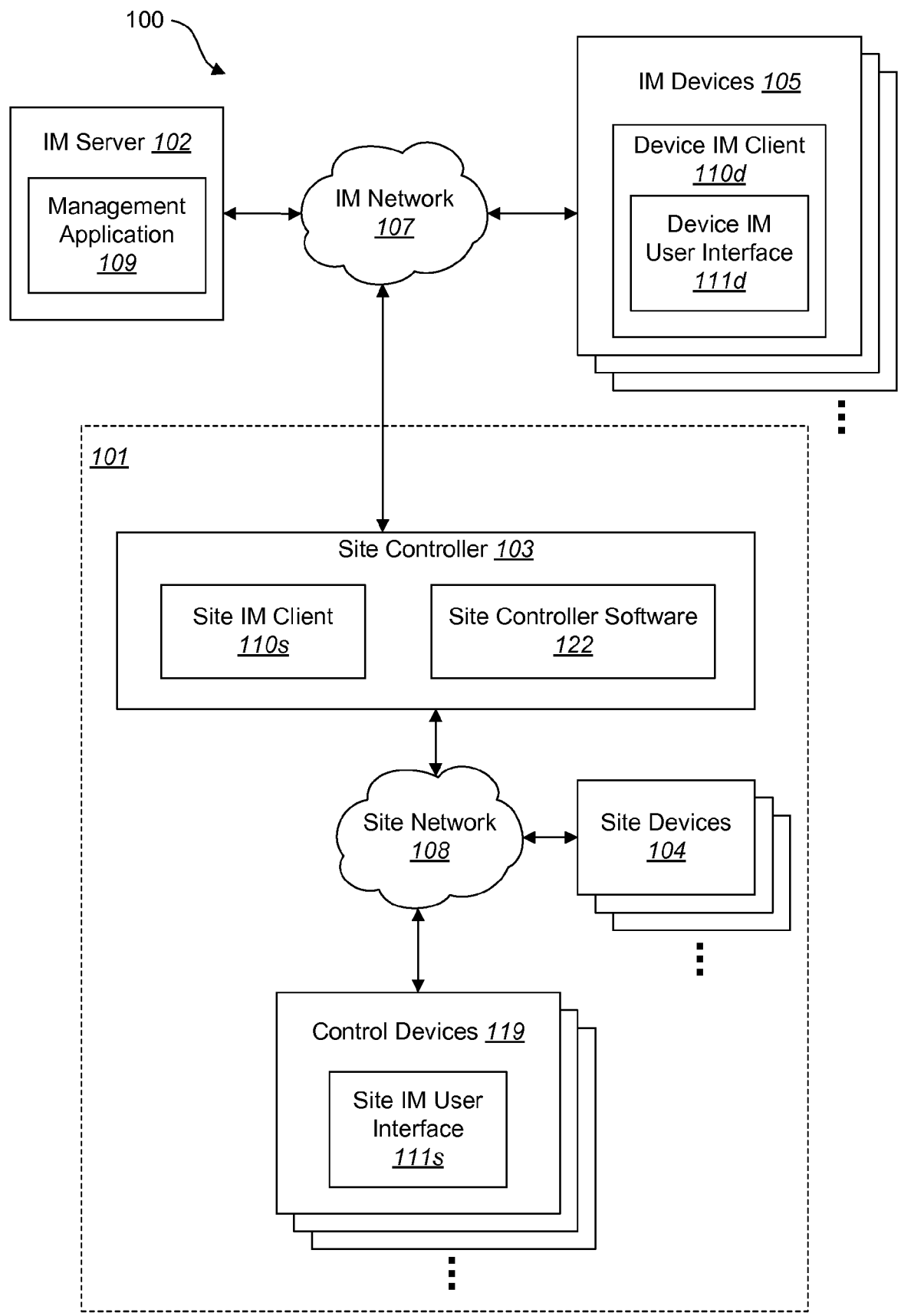
FIG. 1 is a block diagram illustrating a system for instant messaging using a control device.

A method for instant messaging using a control device is described. A user is authenticated with an instant messenger server. A message is received. The received message includes message data from the instant messenger server. It is determined whether the message should be forwarded to the control device. If it was determined that the message should be forwarded to the control device, the received message is forwarded to the control device.

A computer system that is configured for instant messaging using a control device is described. The computer system includes a control device. The control device is in electronic communication with the site controller. The computer system also includes a site controller. The site controller includes a processor. The site controller also includes memory in electronic communication with the processor. The site controller further includes instructions stored in the memory. The instructions are executable to authenticate a user with an instant messenger server. The instructions are executable to receive a message from the instant messenger server. The instructions are executable to determine whether the message should be forwarded to the control device. If it was determined that the message should be forwarded to the control device, the instructions are executable to forward the message to the control device.

A computer-readable medium comprising executable instructions to enable instant messaging using a control device is disclosed. The instructions are executable to authenticate a user with an instant messenger server. The instructions are executable to receive a message from the instant messenger server. The instructions are executable to determine whether the message should be forwarded to the control device. If it was determined that the message should be forwarded to the control device, the instructions are executable to forward the message to the control device.

In some embodiments, determining whether the message should be forwarded to the control device includes comparing the message with a list of messages that are to be forwarded. In other embodiments, determining whether the message should be forwarded to the control device includes comparing the message with a list of messages that are not to be forwarded.

In some embodiments, determining whether the message should be forwarded to the control device includes querying a device database based on a specific type of device. In other embodiments, determining whether the message should be forwarded to the control device includes querying a device database based on a specific device class. In further embodiments, determining whether the message should be forwarded to the control device includes querying a device database based on a specific service class.

In some embodiments, determining whether the message should be forwarded to the control device is performed without user input. In other embodiments, determining whether the message should be forwarded to the control device is performed without user input and the message includes a protocol message indicating presence.

In some embodiments, a service class is specified for an instant messenger service. In other embodiments, the received message is processed before forwarding the message to the device. In further embodiments, the message data includes message formatting and processing the received message includes removing the message formatting from the message data.

In some embodiments, a list of messages that are to be forwarded is stored in the memory and the determining instructions include comparing the message with the list of messages that are to be forwarded. In other embodiments, a list of messages that are not to be forwarded is stored in the memory and the determining instructions include comparing the message with the list of messages that are not to be forwarded.

In some embodiments, a device database is stored in the memory and the determining instructions include querying the device database. In other embodiments, the determining instructions include querying a device database.

In some embodiments, the control device includes a television remote control. In other embodiments, the control device includes an LCD keypad. In further embodiments, the message includes a protocol message indicating presence and a presence indicator is displayed on the LCD keypad.

In some embodiments, the site controller does not require a keyboard or a mouse for standard operation. In further embodiments, the site controller includes an embedded system that includes built-in audio ports, built-in video ports, and built-in infrared in and out ports, and wherein the site controller does not require an external exclusive computer monitor for standard operation.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 is a block diagram illustrating a system 100 for instant messaging (IM) using a control device 119. The system 100 may include an IM server 102, multiple IM devices 105, and a site 101. The IM server 102 may use various messaging protocols. For example, the IM server 102 may use open messaging protocols, such as Jabber, Internet Relay Chat (IRC), and/or other open messaging protocols. In another example, the IM server may use closed messaging protocols, such as the .NET Messenger Service, YMSG, OSCAR, and/or other closed messaging protocols.

The IM server 102 may include a management application 109. The management application 109 may be used to authenticate users, forward instant messages, store contact lists, monitor presence information, send announcements of online contacts from a contact list, and other IM functions. The IM devices 105 may include a device IM client 110*d*, which may also include a device IM user interface 111*d*. The IM devices 105 may be capable of carrying on an IM session with another device through an IM network 107.

The site 101 may include a site controller 103. The site controller 103 may include site controller software 122 and a site IM client 110s. In the present embodiment, the site IM client 110s on the site controller 103 may not include a site IM user interface 111s. The site controller software 122 may be used to control the site devices 104 in the site 101. The site controller 103 may be in electronic communication with the IM server 102 and the IM devices 105 via the IM network 107.

The site 101 may include multiple site devices 104. For the purposes of this disclosure, site devices 104 may include control devices 119. In the present embodiment, the control devices 119 may differ from the other site devices 104 because the control devices 119 may include a site IM user interface 111s. The site devices 104 may not have a connection to a network outside of the control of the site controller 103. For example, in the present embodiment, the site devices 104 may not be in direct electronic communication with the IM network 107; rather, the site devices 104 may connect to the IM network 107 through the site controller 103.

The site controller 103 may be in electronic communication with the site devices 104 over a site network 108. The site devices 104 may communicate with the site controller 103 using a wired or wireless network. For example, the site devices 104 may communicate with the site controller 103 via infrared (IR) communication, an Ethernet connection, a wireless connection using the 802.11g (WiFi) standard, a wireless connection using the 802.15.4 (ZigBee) standard, or other wired or wireless connections.

Figure 2:
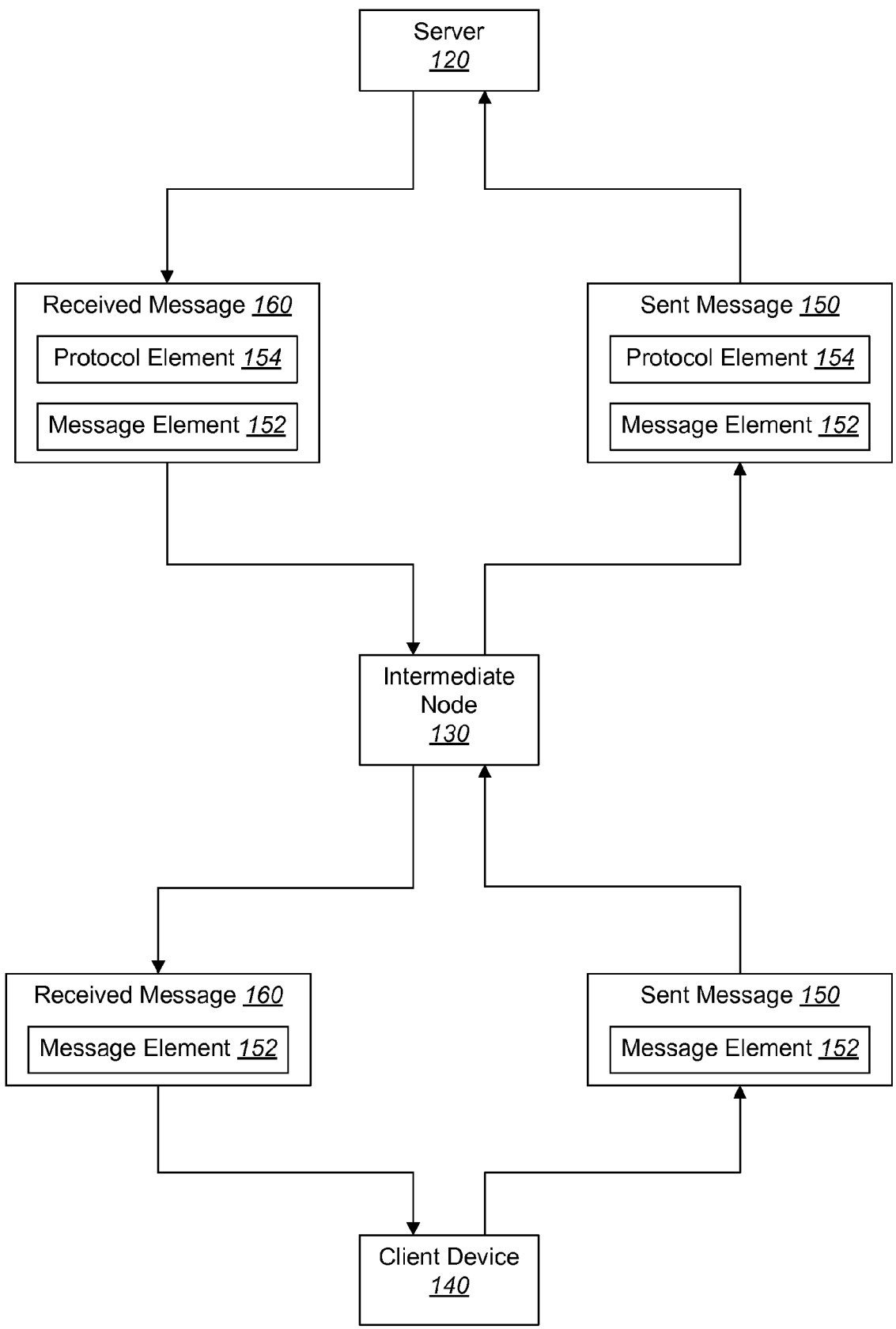
FIG. 2 is a block diagram illustrating a system for instant messaging using a client device.

FIG. 2 is a block diagram illustrating a system for instant messaging (IM) using a client device 140. The system may include a server 120, an intermediate node 130, and a client device 140. The server 120 may send a received message 160 to the intermediate node 130. The received message 160 may include a message element 152 and/or a protocol element 154. The intermediate node 130 may receive the received message 160. The intermediate node 130 may process the received message 160 before forwarding the received message 160 to the client device 140. For example, the intermediate node 130 may remove the protocol element 154 from the received message 160 before forwarding the received message 160 to the client device 140. In other embodiments, the intermediate node 130 may simply forward the received message 160.

The forwarded received message 160 may be received by the client device 140. The client device 140 may send a sent message 150 to the intermediate node 130. The sent message 150 may include a message element 152. The sent message 150 may not initially include a protocol element 154.

The intermediate node 130 may receive the sent message 150. The intermediate node 130 may add a protocol element 154. The intermediate node 130 may send the sent message 150 to the server 120.

In some embodiments, the received message 160 and the sent message 150 may include a single event. For example, the messages 150, 160 may include a presence event. The presence event may be mapped to a device, such as a control device 119, a site controller 103, a site device 104, and/or another device. The presence event may include presence information. Mapping the presence event and/or presence information may include notifying a user regarding the event and/or information. For example, based on the presence event and/or presence information a device may display a notification based on the event or information. In another example, the device may produce an audible chime. In a further example, the device may generate a flashing light or other signal to notify the user regarding the received presence event and/or information. Other types of notification may also be used.

Figure 3:
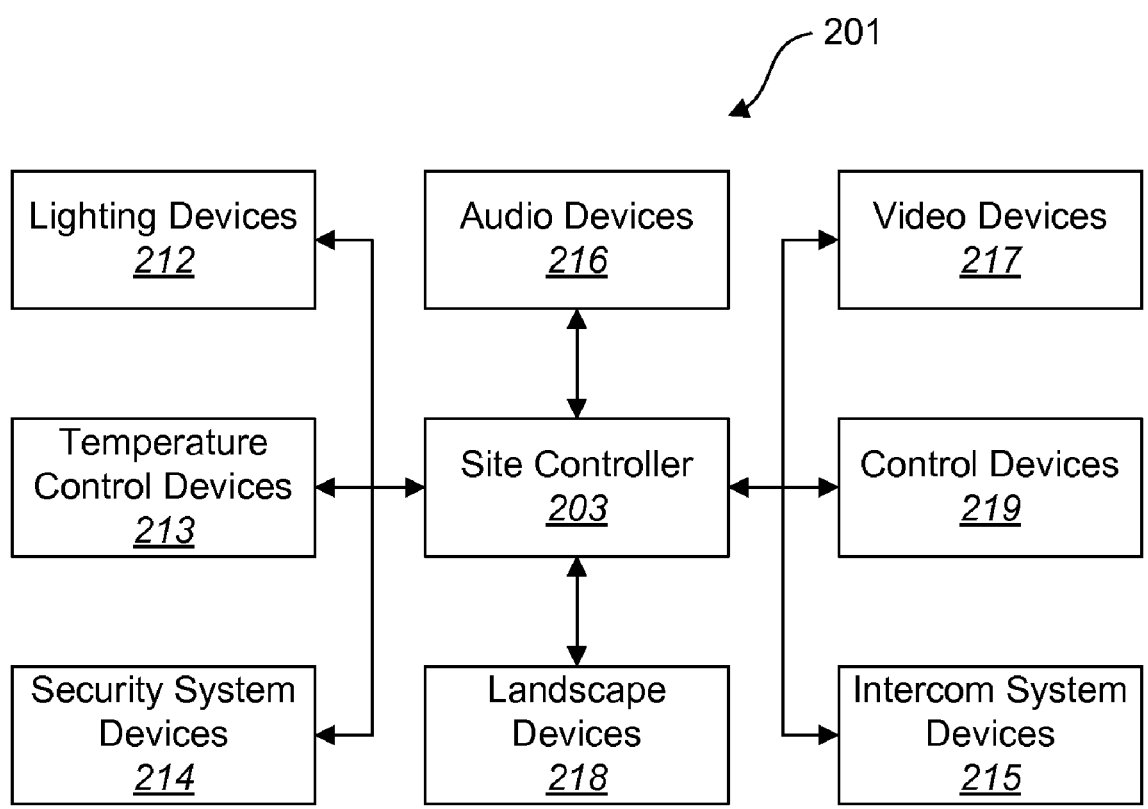
FIG. 3 is a block diagram illustrating an embodiment of a site in which the present systems and methods may be implemented.

FIG. 3 is a block diagram illustrating an embodiment of a site 201 in which the present systems and methods may be implemented. The site 201, in the present embodiment, includes a site controller 203 and other site devices 104. The site controller 203 may be in electronic communication with the site devices 104. A site 101 may include multiple site controllers 103, but typically requires that one of the site controllers 103 is designated as the primary site controller 203.

The site devices 104, in the present embodiment, may include lighting devices 212, temperature control devices 213, security system devices 214, intercom system devices 215, audio devices 216, video devices 217, landscape devices 218, and control devices 219. Lighting devices 212 may include light switches, dimmers, window blinds, etc. Temperature control devices 213 may include thermostats, fans, fireplaces, and the like. Security system devices 214 may include security cameras, motion detectors, door sensors, window sensors, gates, or other security devices. Intercom system devices 215 may include intercom microphones, intercom related video devices, and other devices typically associated with an intercom system. Audio devices 216 may include AM/FM radio receivers, XM radio receivers, CD players, MP3 players, cassette tape players, and other site devices 104 capable of producing an audio signal. Video devices 217 may include televisions, monitors, projectors, and other site devices 104 capable of producing a video signal. Landscape devices 218 may include sprinkler system devices, drip system devices, and other landscape related devices. The control devices 219 may include touch screens, keypads, and remote controls. For example, control devices 219 may include site remote controls, LCD keypads, mini touch screens, or other control devices 219 capable of controlling a site controller 103.

Figure 4:
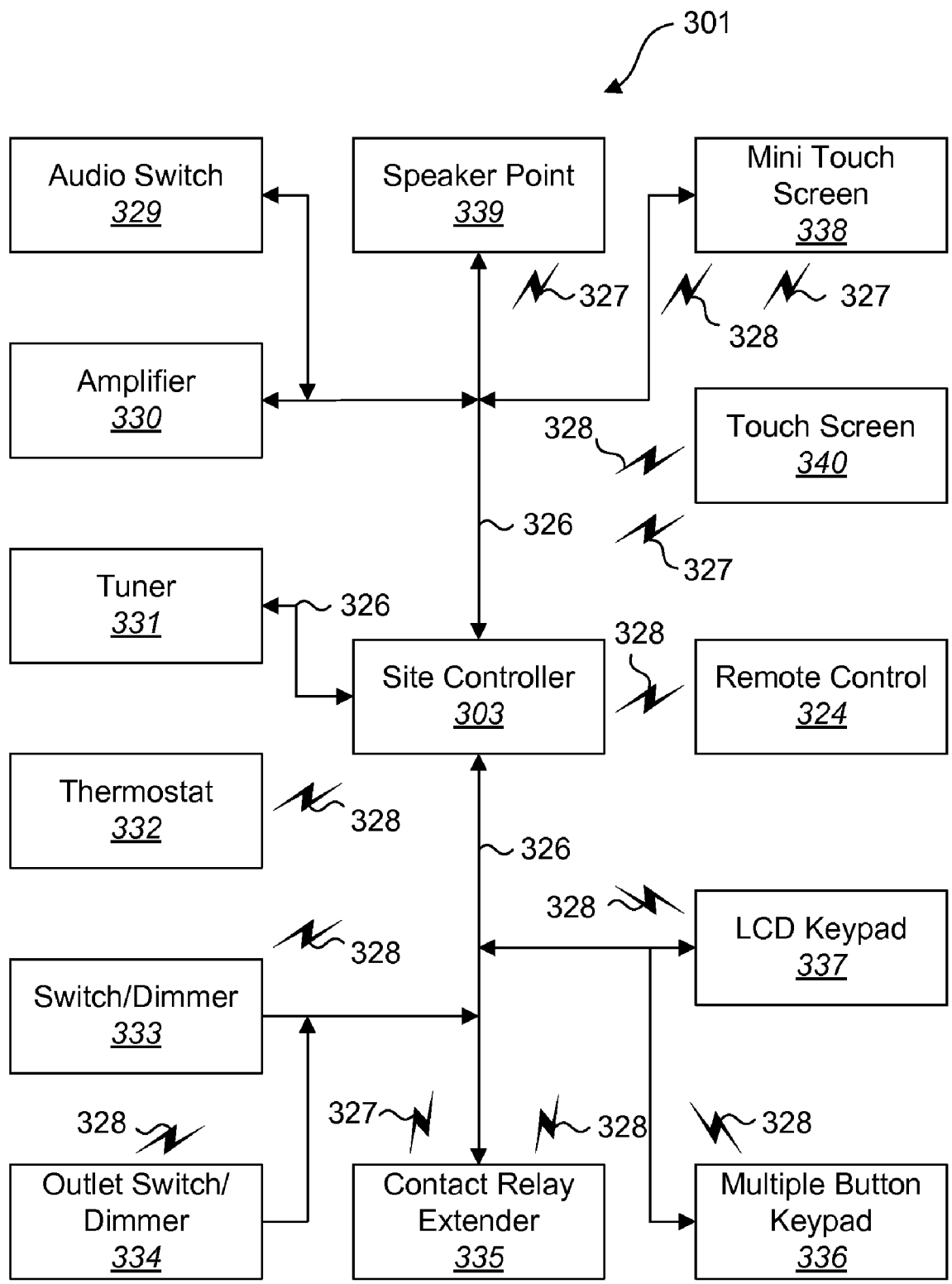
FIG. 4 is a block diagram illustrating the connections between a site controller and the site devices in a site according to another embodiment of a site in which the present systems and methods may be implemented.

FIG. 4 is a block diagram illustrating the connections between a site controller 303 and the site devices 104 in a site 301 according to another embodiment of a site 301 in which the present systems and methods may be implemented. The site controller 303 may be connected to the site devices 104 via wireless or wired connections. In the present embodiment, the site controller 303 may be connected to the site devices via an Ethernet connection 326, a WiFi connection 327, a ZigBee connection 328, or a combination of the three. The site controller 303 may be capable of communicating via these network connections, i.e. Ethernet, WiFi, or ZigBee connections 326, 327, 328 or other connections. The site controller 303 and/or the site devices 104 in the site 301 may not have access to the Internet.

In the present embodiment, an audio switch 329, amplifier 330, and tuner 331 may be connected to the site controller 303 via Ethernet connections 326. The site remote control 324 and a thermostat 332 may be connected to the site controller 303 via ZigBee connections 328. A switch/dimmer 333, outlet switch/dimmer 334, multiple button keypad 336, and LCD keypad 337 may be connected to the site controller 303 via Ethernet connections 326 and ZigBee connections 328. A mini touch screen 338 and a contact relay extender 335 may be connected to the site controller 303 via an Ethernet connection 326, a ZigBee connection 328, and a WiFi connection 327. A speaker point 339 may be connected to the site controller 303 via an Ethernet connection 326 and a WiFi connection 327. A touch screen 340 may be connected to the site controller 303 via a ZigBee connection 328 and a WiFi connection 327.

Figure 5:
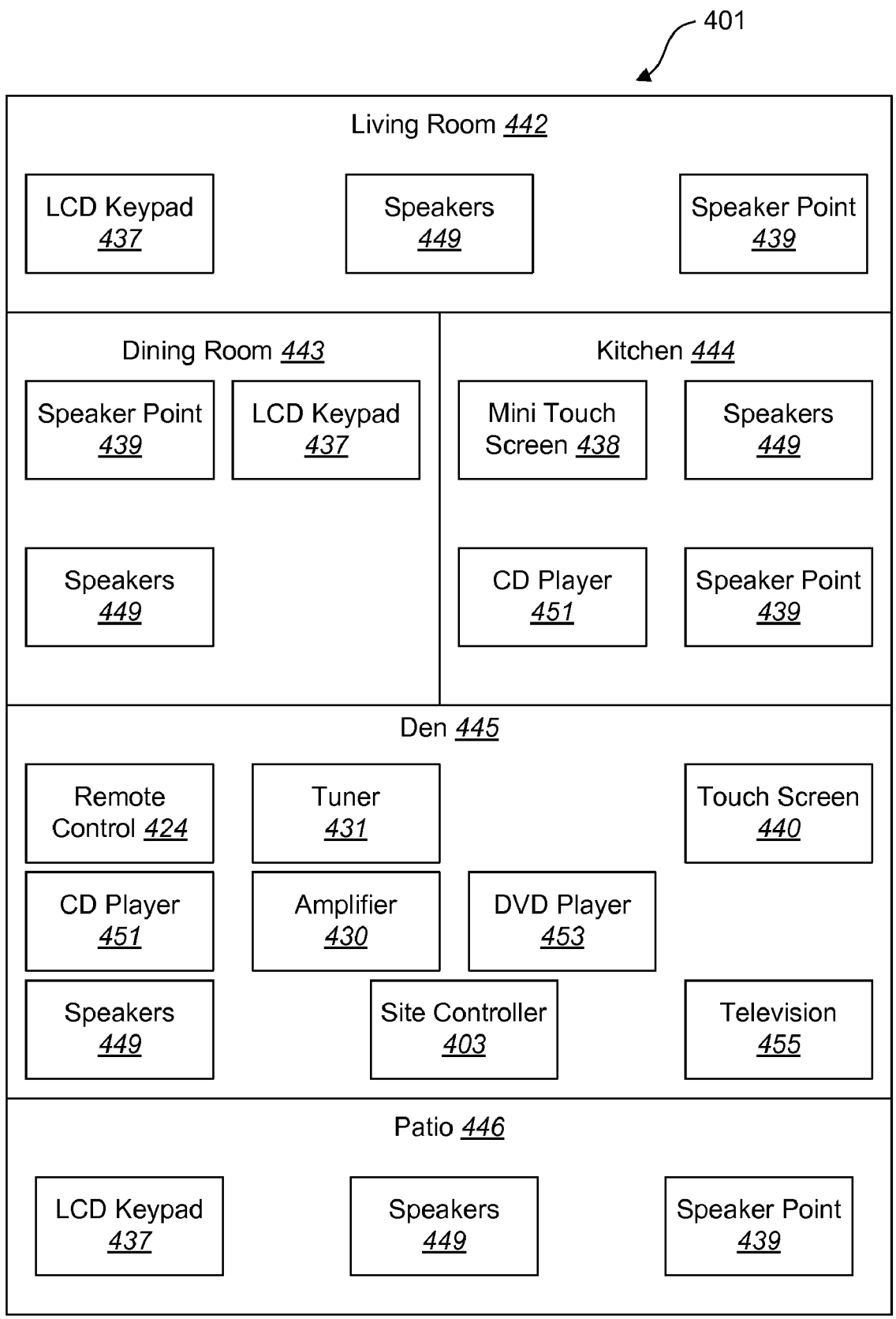
FIG. 5 is a block diagram illustrating an exemplary audio/visual home automation site in which the present systems and methods may be implemented.

FIG. 5 is a block diagram illustrating an exemplary audio/visual home automation site 401 in which the present systems and methods may be implemented. The audio/visual home automation site 401 may include various areas, such as a living room 442, dining room 443, kitchen 444, den 445, and a patio 446. Though the present embodiment illustrates a home automation site 401, other sites 101 may also implement the present systems and methods. For example, the present systems and methods may be implemented in an office building, warehouse, or other site 101. A site 101 may not be limited to a particular building or space. Rather, a site 101 may include a site controller 103 and various site devices 104 in electronic communication with the site controller 103. A home, for example, may include more than one site 101. In some embodiments, multiple site controllers 103 may be used within the same site, though one site controller 103 is typically designated as the primary site controller 403.

Additional site devices 104, other than the site devices 104 shown in FIG. 5, such as security system devices 214, intercom system devices 215, temperature control devices 213, etc., may also be used in the present embodiment of a site 401. However, for ease of presentation, only audio devices 216, video devices 217, touch screens 340, remote controls 324, and LCD keypads 337 are shown in FIG. 4. In the present embodiment, the audio devices 216 include amplifiers 430, tuners 431, speakers 449, speaker points 439, and CD players 451. The video devices 217, in the present embodiment, may include DVD players 453 and televisions 455. In the present embodiment, control devices 119 may include site remote controls 424, LCD keypads 437, mini touch screens 438, or other control devices 119. Other audio devices 216 and video devices 217 may be used in the present systems and methods, such as MP3 players, digital video recorders, satellite boxes, cable boxes, video game systems, etc.

The site controller 403, in the present embodiment of a site 401, may be located in the den 445. The site controller 403 may be in electronic communication with various site devices 104 over the site network 108. The various site devices 104 shown in FIG. 5 may be in electronic communication with the site controller 403 using the connections, i.e. Ethernet, WiFi, or ZigBee connections 326, 327, 328, described in connection with the site 301 of FIG. 4, or may use other types of connections. In the present embodiment, the den 445 may include the site controller 403, a CD player 451, a DVD player 453, an amplifier 430, a tuner 431, a television 455, and speakers 449. The speakers 449 in the den 445 may be connected directly to the site controller 403. A site remote control 424 and a touch screen 440 may also be located in the den 445.

In the present embodiment, speakers 449 that are not directly connected to the site controller 403, such as the speakers 449 in the living room 442, dining room 443, and kitchen 444 and the speakers 449 on the patio 446, may be connected to one of the speaker points 439. The speaker points 439 may allow the speakers 449 not directly connected to the site controller 403 to be controlled by the site controller 403. For example, the site controller 403 may transmit audio signals to the speakers 449 via the speaker points 439. The audio signals, in the present embodiment, may be transmitted to the speaker points 439 over an Ethernet connection 326 or a WiFi connection 327. However, any connection capable of the bandwidth necessary to transmit audio signals may be used. Similar connections may be used for transmitting video signals over a site 401.

The site remote control 424 and touch screen 440 in the den 445, the LCD keypads 437 located in the living room 442, dining room 443, and on the patio 446, and the mini touch screen 438 located in the kitchen 444 may be used to control all of the site devices 104 in the site 401 that are connected to the site controller 403. For example, the LCD keypad 437 in the living room 442 may control the CD player 451 in the den 445 to play music over the speakers 449 in the living room 442 via the speaker point 439 in the living room 442. The LCD keypad 437 in the living room 442 may also, for example, control the CD player 451 in the den 445 to play music over all speakers 449 in the site 401 via their respective speaker points 439 or a direct connection to the site controller 403.

Because control devices 119 may potentially be found in any area of the site 401, using a control device 119 with a site IM user interface 111s may provide an advantage over other IM devices 105 because the control devices 119 may always be within reach.

Figure 6:
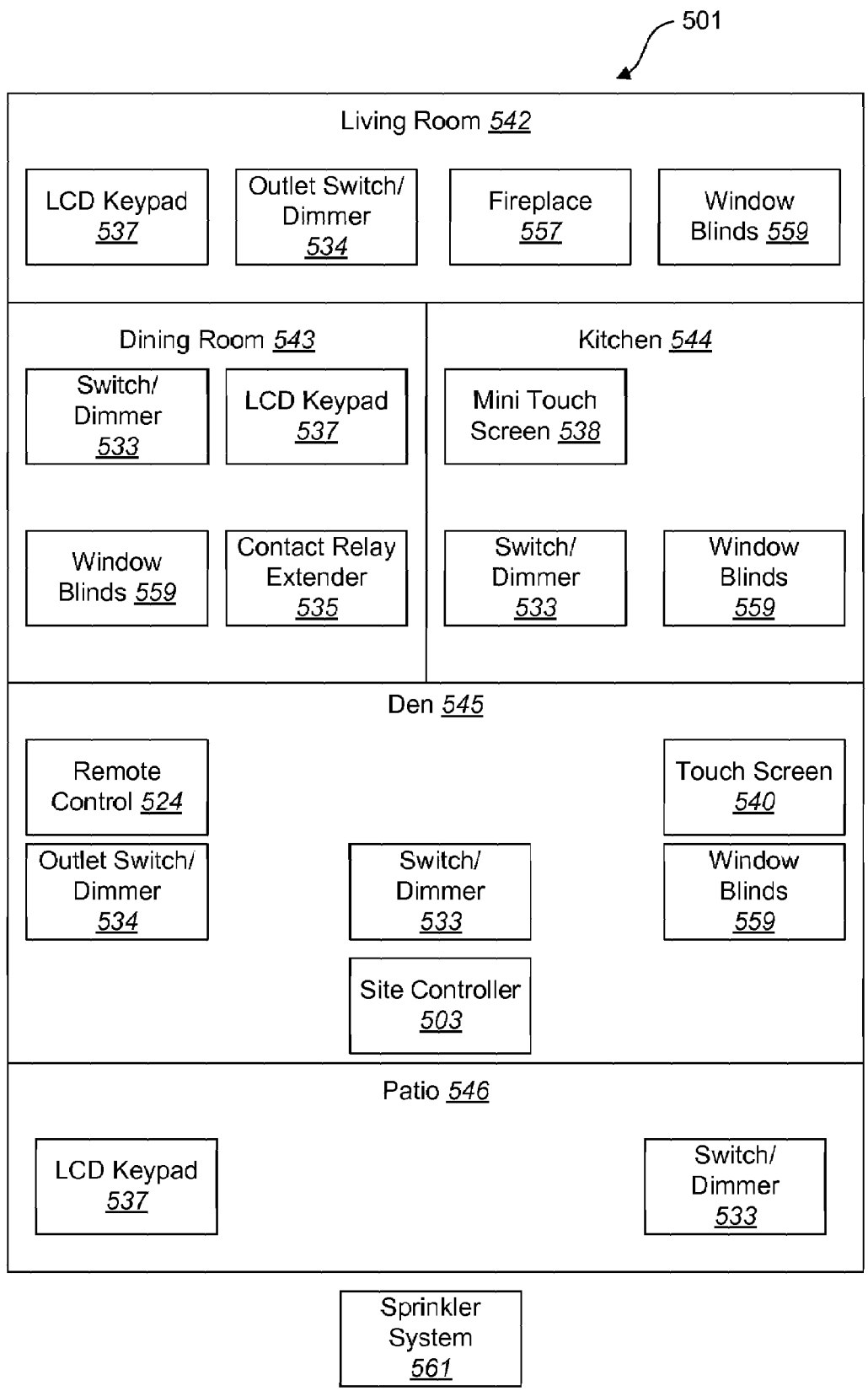
FIG. 6 is a block diagram illustrating another exemplary home automation site in which the present systems and methods may be implemented.

FIG. 6 is a block diagram illustrating another exemplary home automation site 501 in which the present systems and methods may be implemented. The present exemplary home automation site 501 may include various areas, such as a living room 542, dining room 543, kitchen 544, den 545, and patio 546.

As with the audio/visual exemplary home automation site 401, though the present embodiment illustrates a home automation site 501, other sites 101 may also implement the present systems and methods. Also, as with the audio/visual exemplary home automation site 401, other site devices 104, other than the site devices 104 shown in FIG. 6, such as security system devices 214, intercom system devices 215, temperature control devices 213, etc., may also be used in the present embodiment of a site 501. However, for ease of presentation, only lighting devices 212, landscape devices 218, touch screens 340, remote controls 324, and LCD keypads 337 are shown.

In the present embodiment, the lighting devices 212 may include switch/dimmers 533, outlet switch/dimmers 534, fireplaces 557, and window blinds 559. The landscape devices 218, in the present embodiment, may include a sprinkler system 561. Other lighting devices 212 and landscape devices 218 may also be used with the present systems and methods.

As with the previous embodiment, the site controller 503, in the present embodiment of a site 501, may be located in the den 545. The site controller 503 may be in electronic communication with various site devices 104 via the site network 108. The various site devices 104 shown in FIG. 6 may be in electronic communication with the site controller 503 using the connections, i.e. Ethernet, WiFi, or ZigBee connections 326, 327, 328 described in connection with the site 301 of FIG. 4, or may use other types of connections. In the present embodiment, the den 545 may include the site controller 503, a switch/dimmer 533, an outlet switch/dimmer 534, and window blinds 559. The site remote control 524 and touch screen 540 may be located in the den 545.

The site remote control 524 and touch screen 540 located in the den 545, the LCD keypads 537 located in the living room 542, dining room 543, and on the patio 546, and the mini touch screen 538 located in the kitchen 544 may be used to control all of the site devices 104 in the site 501 that are connected to the site controller 503, as with the site devices 104 described in connection with the site 401 shown in FIG. 5.

Typically devices like the window blinds 559, the fireplace 557 or the sprinkler system 561 may not be capable of communication using an Ethernet, WiFi, or ZigBee connection 326, 327, 328. In order to control such devices, the contacts, relays, or other connections that control their function are connected to a site device 104 that is capable of communication with the site controller 503.

For example, the window blinds 559 in the dining room 543 may be connected to a contact relay extender 535. The contact relay extender 535 may then communicate with the site controller 503 using an Ethernet connection 326, a WiFi connection 327, or a ZigBee connection 328. The site controller 503 may then be programmed to raise, lower, or adjust the blinds 559. If a user wanted to lower the blinds 559 in the dining room 543, the user may use the LCD keypad 537 to send a signal to the site controller 503, which would send a signal to the contact relay extender 535, which would then send a signal to the servo of the window blinds 559 to lower the blinds. The sprinkler system 561 may be connected to the site controller 503 in a similar fashion.

Figure 7:
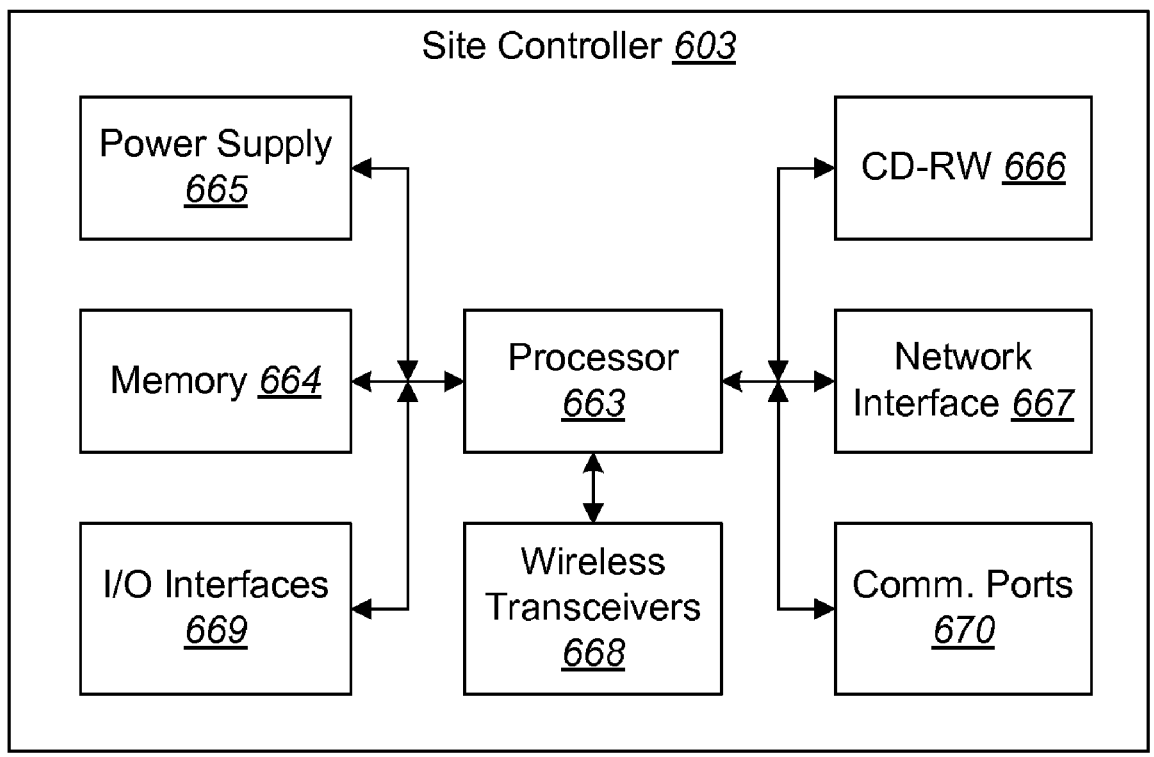
FIG. 7 is a block diagram illustrating various hardware components that may be used in an embodiment of site controller that may be utilized for instant messaging using a control device.

FIG. 7 is a block diagram illustrating various hardware components that may be used in an embodiment of the site controller 603 that may be utilized for instant messaging using a control device 119. The site controller 603 may include a processor 663 that is in electronic communication with memory 664. The memory 664 may include volatile and/or non-volatile memory. The site controller 603 may include a power supply 665. The site controller 603 may include a CD-RW drive 666. In other embodiments, the CD-RW drive 666 may not be a writeable drive, but may only be a CD-ROM drive. In still other embodiments, the CD-RW drive 666 may be a DVD-RW and/or a DVD-ROM drive. The CD-RW drive 666 may also be a Blu-ray disk and/or a HD DVD drive. The site controller 603 may be capable of using the CD-RW drive 666 to rip audio or video data from CDs and/or DVDs.

The site controller 603 may include a network interface 667 that allows the site controller 603 to connect using wired connections, such as Ethernet connections 326. The network interface 667 may use various protocols to enable the site controller 603 to interface with any wired network. The site controller 603 may include wireless transceivers 668. In the present embodiment, the site controller 603 may include a WiFi transceiver and a ZigBee transceiver. The site controller 603 may include any type of wireless transceiver 668. For example, the wireless transceiver 668 may allow the site controller 603 to transmit and receive data using any wireless protocol, such as WiFi, ZigBee, Bluetooth, Ultra Wideband, Wimax, and/or cellular protocols, such as GSM or EVDO.

The site controller 603 may include I/O interfaces 669. For example, the I/O interfaces 669 may include inputs and/or outputs such as buttons, selection dials, serial ports, contact ports, relay ports, IR windows, IR ports, video sense loop ports, audio ports, and video ports. The site controller 603 may include communication ports 670. The communication ports 670 may include USB ports, firewire ports, or other ports for communicating with other devices.

Figure 8:
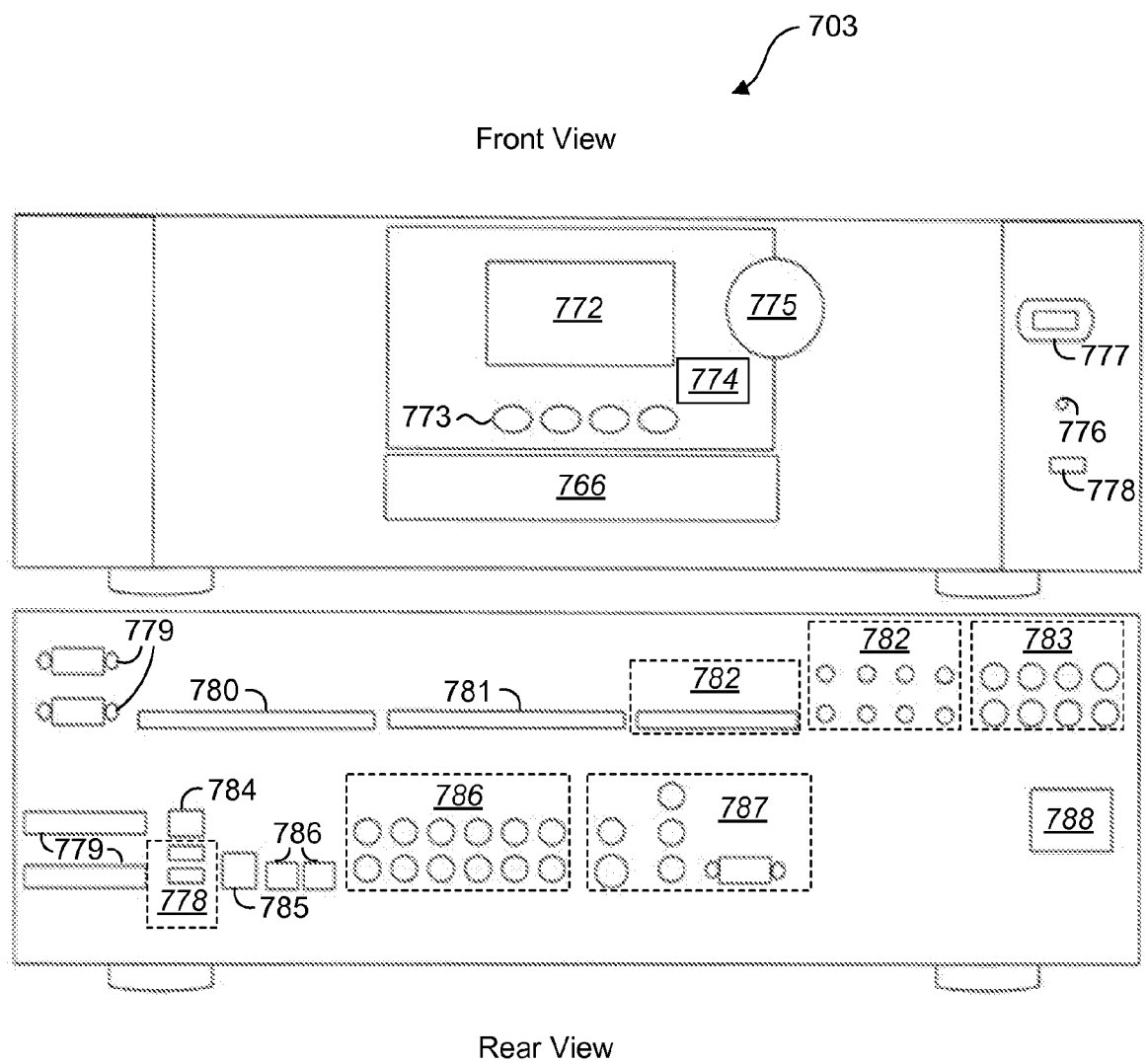
FIG. 8 is a block diagram illustrating the various features available on an exemplary site controller.

FIG. 8 is a block diagram illustrating the various features available on an exemplary site controller 703. Specifically, FIG. 8 shows the front and back of an exemplary site controller 703. Most connectors and ports are typically found on the back of the site controller 703 leaving the front more aesthetically pleasing. However, the location of the various connectors and ports is typically not functionally important.

The site controller 703 may include a display area 772. The display area 772 in the present embodiment may be used to display settings, playlist sections, title sections, media information, receiver status, and system menus. The site controller 703 may also include various buttons 773 for selecting options displayed in the display area 772.

The site controller 703 may also include an IR in window 774. The IR in window 774 may be used to receive IR codes from the site remote control 324 or from any other device capable of sending IR signals, including other remote controls (not shown) used to control devices that are not capable of communication with the site controller 703. The site controller 703 may include a selection dial 775. The selection dial 775 may be used to scroll through menus and media lists displayed in the display area 772.

In the present embodiment, the site controller 703 may include a reset button 776. The reset button 776 may be used to refresh the site controller software 122. The site controller 703 may also include a WiFi antenna 777. The WiFi antenna 777 may be used with an extender (not shown) to improve reception of wireless signals. A ZigBee antenna (not shown) may also be used to extend the range of a wireless transceiver 668 using a ZigBee connection 328.

The site controller 703 may also include a CD-RW drive 766. As discussed above, the CD-RW drive 766 may be replaced with any drive that is capable of playing CD or DVD related media. The CD-RW drive 766 may be used to import CD or DVD data into the memory 664 of the site controller 703. The site controller 703 may also include a USB port 778. The USB port 778 may be used to import data from USB enabled devices.

The site controller 703 may include serial ports 779. The serial ports 779 may include standard serial ports and configurable serial ports. The standard serial ports may be used for RS-232 or other I/O devices, which include hardware flow control. In the present embodiment, the site controller 703 may include two standard serial ports. The configurable serial ports may be used for RS-232, RS-422, or RS-485 devices or for other serial I/O devices. In the present embodiment, the site controller 703 may include two configurable serial ports.

The site controller 703 may include contact ports 780. The contact ports 780 may include a pluggable terminal block connector that may be used for dry contact closure, or logic input connections, such as door switches or motion sensors. In the present embodiment, the site controller 703 may include six contact ports 780. The site controller 703 may include relay ports 781. The relay ports 781 may include a pluggable terminal block connector that may be used for normally closed or normally opened switchable connections, such as blinds, fireplace, or projector screens. In the present embodiment, the site controller 703 may include six relay ports 781.

The site controller 703 may include IR ports 782. The IR ports 782 may include IR in ports and IR out ports. The IR in ports may include a pluggable terminal block connector that may be used for handheld IR devices, such as device specific remote controls (not shown). In the present embodiment, the site controller 703 may include four IR in ports. The IR out ports may include 3.5 mm earphone jacks. The IR out ports may be used for IR sticky emitters that can be placed over IR readers on media players, TVs, or other targets to transmit an IR signal from site controller 703 to the target. In the present embodiment, the site controller 703 may include eight IR out ports. The site controller 703 may include video sense loop in/out ports 783. The video sense loop in/out ports 783 may be composite ports for video sources, such as DVD players or VCRs, which allow the site controller 703 to detect the On/Off status of devices that use the same IR code for both on and off commands. The site controller 703, in the present embodiment, may include four pairs of video sense loop in/out ports 783 (four in and four out).

The site controller 703 may include an Ethernet connector 784 for establishing an Ethernet connection 326 with the site devices 104 in a site 101. The Ethernet connector 784 may be connected to the network interface 667 on the site controller 703. The Ethernet connector 784 may be an RJ-45 for a 10/100 BaseT Ethernet connector. In the present embodiment, the site controller 703 may include an additional USB port 778 on the back of the site controller 703. A modem port 785 may be included with the site controller 703. The modem port 785 may be an RJ-11 port for a modem to support caller ID or a voice menu system.

The site controller 703 may also include audio in/out ports 786. The audio in ports may be RCA jacks for stereo channel input for stereo analog sources. In the present embodiment, the site controller may include three audio in ports. The audio out ports may be RCA jacks for stereo channel output. In the present embodiment, the site controller 703 may include three audio out ports. The audio in/out ports 786 may include digital audio in/out ports. The digital audio in/out ports may be designed for a Toslink™ optical cable for digital audio in/out, like MP3 players, CD players, DVD players, etc.

The site controller 703 may include various video ports 787. The video ports 787 may be in/out ports and may include composite video ports, S-Video ports, component video ports, and/or VGA ports. The video ports 787 may be used to display navigation menus on a monitor or TV. In the present embodiment, the video ports 787 include a composite video out port, an S-Video out port, a component video out port, and a VGA out port. The video ports 787 may display, for example, instant messaging information, such as presence information, etc. A power plug port 788 may be included in the site controller 703.

The site controller 703 is different than a personal computer for a number of reasons. The site controller 703 is an embedded system that is specialized for the functions and purposes set forth herein. The site controller 703 generally does not include a keyboard or mouse for standard operation. Unlike a personal computer, the site controller 703 may not contain an expandable motherboard. For example, the site controller 703 may not include expandable memory slots or expandable ports, such as a PCI, AGP, or PCI Express card slot. Unlike a personal computer, the site controller 703 may also not have an exclusive computer monitor. For example, typically a personal computer may include a relatively large monitor or display that is primarily for viewing an operating system user interface and executed programs. The site controller 703 may merely use a television or monitor for brief periods of time, although the television or monitor may primarily be used for viewing television programming, DVDs, etc. In another example, the site controller 703 may be used without a separate monitor; the site controller 703 may use the display area 772. Typically, a personal computer with such a small display area would be incapable of the multiple interfaces and ports that may be found on a site controller 703. The site controller 703 may also not have the capability to install and run third party software, such as word processing software. The site controller 703 typically does not allow a user to install and run third party software on the controller 703. Unlike a personal computer, a typical user generally could not install a different operating system on the site controller 703.

Figure 9:
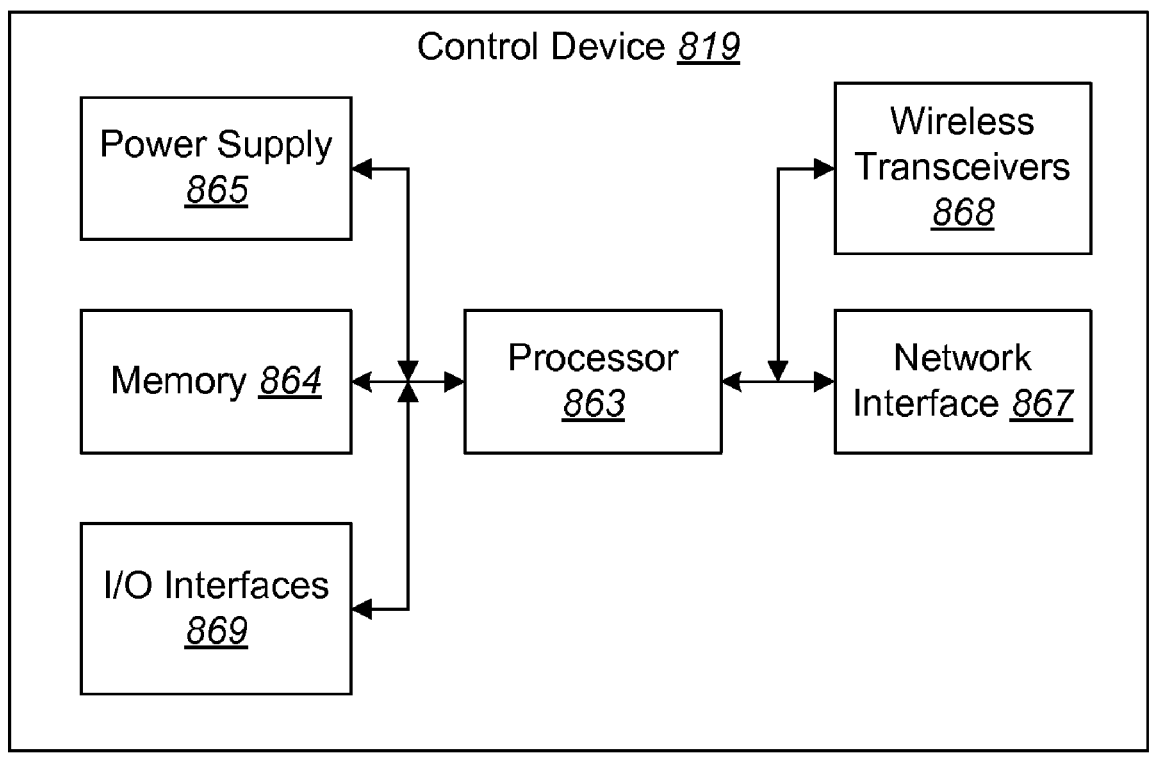
FIG. 9 is a block diagram illustrating various hardware components that may be used in an embodiment of a control device that may be used for instant messaging.

FIG. 9 is a block diagram illustrating various hardware components that may be used in an embodiment of a control device 819 that may be used for instant messaging. The control device 819 may include a processor 863 that is in electronic communication with memory 864. The memory 864 may include volatile and/or non-volatile memory. The control device 819 may include a power supply 865. In most embodiments, the control device 819 does not include a CD-RW drive 666.

The control device 819 may include a network interface 867 that allows the control devices 819 to connect to wired connections, such as Ethernet connections 326. The network interface 867 may use various protocols to enable the control devices 819 to interface with any wired network. In most embodiments, the control devices 819 do not include communication ports 670.

The control devices 819 may include wireless transceivers 868. The control devices 819 may include a WiFi transceiver and/or a ZigBee transceiver. The control devices 819 may include any type of wireless transceiver 868. For example, the wireless transceiver 868 may allow the site device 104 to transmit and receive data using any wireless protocol, such as WiFi, ZigBee, Bluetooth, Ultra Wideband, Wimax, or cellular protocols, such as GSM or EVDO.

The control devices 819 may include I/O interfaces 869. For example, the I/O interfaces 869 may include inputs such as buttons, selection dials, IR ports and/or outputs such as a display area, video out port, or other outputs.

Figure 10:
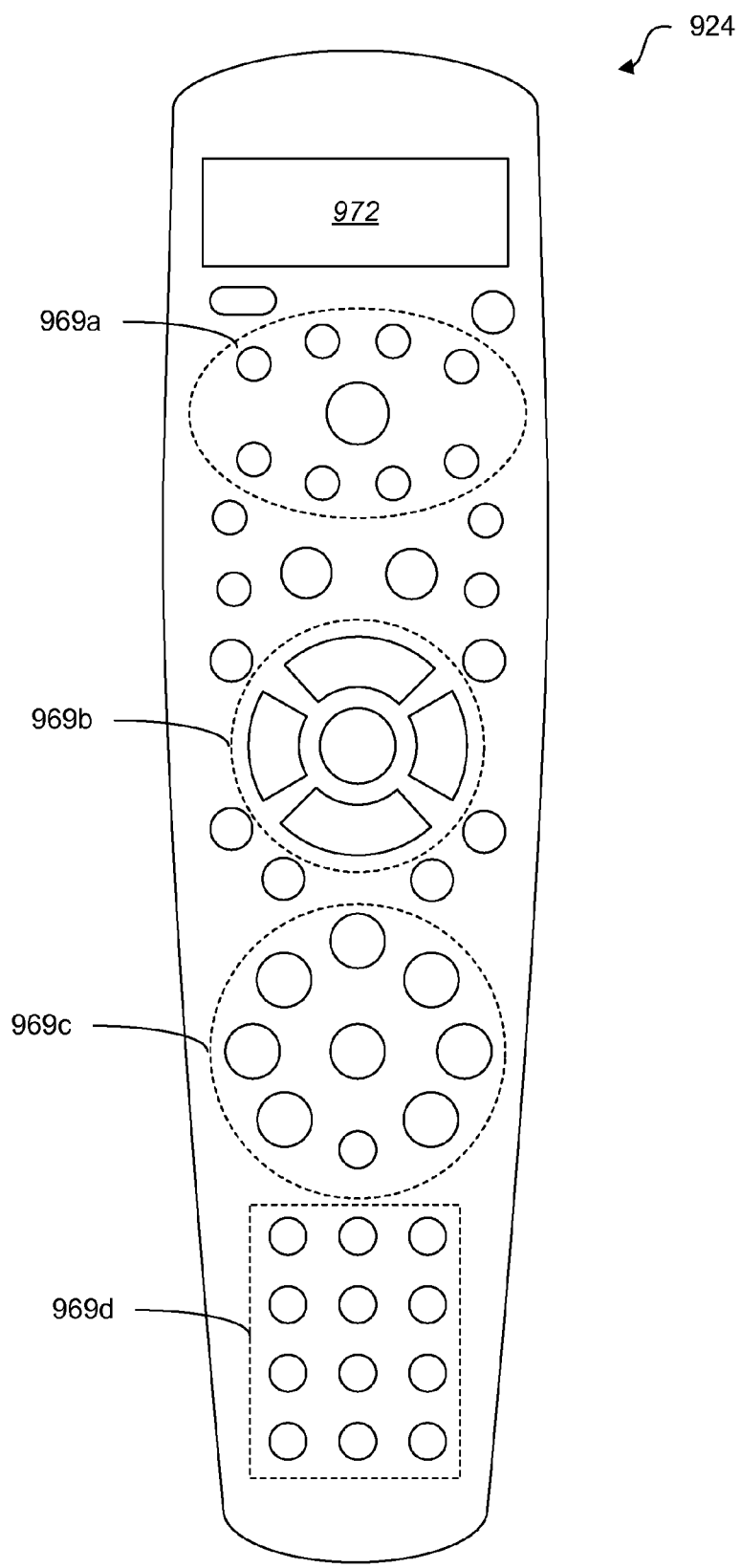
FIG. 10 is a block diagram illustrating the various features available on an exemplary site remote control.

FIG. 10 is a block diagram illustrating the various features available on an exemplary site remote control 924. The site remote control 924 may include a display area 972. The display area 972 may be a backlit LCD screen. In some embodiments, the display area 972 may be a simple LCD screen such that the LCD screen has limited capacity to display information. The display area 972 may be used to display instant messaging data, such as presence information, etc.

The site remote control 924 may include various I/O interfaces 869. The I/O interfaces 869 may include buttons or controls for user input. For example, the site remote control 924 may include activity selection buttons 969a, navigation controls 969b, device control inputs 969c, input controls 969d, or other I/O interfaces 869. The activity selection buttons 969a may allow the user to select which devices to control. For example, the activity selection buttons 969a may include buttons that allow the user to control televisions, video recording/playback devices, temperature control devices, lighting devices, security devices, audio recording/playback devices, or other devices. The activity selection buttons 969a may include a site IM user interface button (not shown) that, when pressed, may start the site IM user interface 111. In alternative embodiments, the site IM user interface may be started by a signal from the site controller 103.

The navigation controls 969b may include navigation buttons that allow a user to navigate through user interface menus. For example, navigation buttons may allow the user to select various options presented by the display area 972.

The device control inputs 969c may include device control buttons. The device control inputs 969c may allow a user to perform functions that were previously performed by the device specific remote control. For example, the device control inputs 969c may include device control buttons such as play, stop, pause, fast-forward, rewind, record, etc. that would typically be found on a DVD or VCR device specific remote control.

The input controls 969d may include numeric, alphanumeric, or other arrangements of input buttons. The input controls 969d may allow a user to input alphanumeric characters. For example, in the present embodiment, the input controls 969d may be numeric buttons such as the numbers 0-9 that may also be used to input text using various systems, such as Multi-Tap or T9, iTap, LetterWise, or other predictive text technology. The input controls 969d may include a qwerty keyboard, thumbboard, or other layout.

The site remote control 924 may include a wireless transceiver 868. The wireless transceiver 868 may be used to send wireless signals over the site network 108. In the present embodiment, the wireless transceiver 868 may be used to send data over a ZigBee connection 328.

Figure 11:
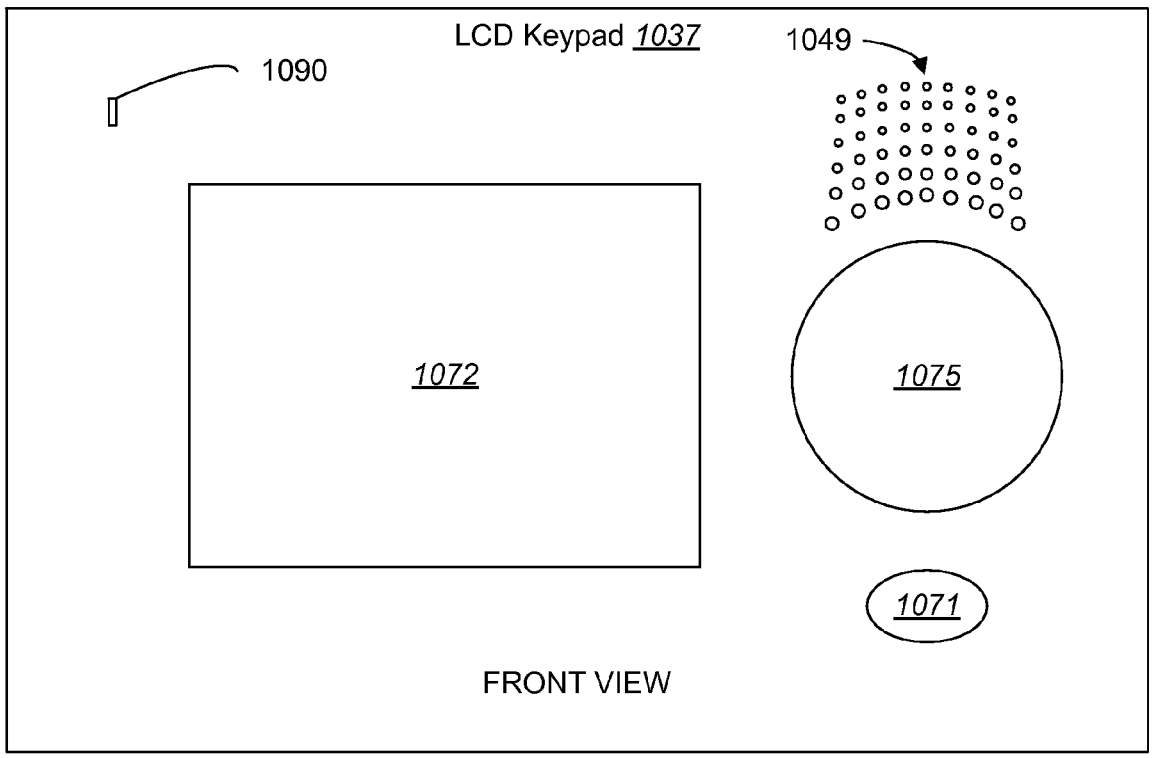
FIG. 11 is a block diagram illustrating the various features available on an exemplary LCD keypad.
Figure 11:
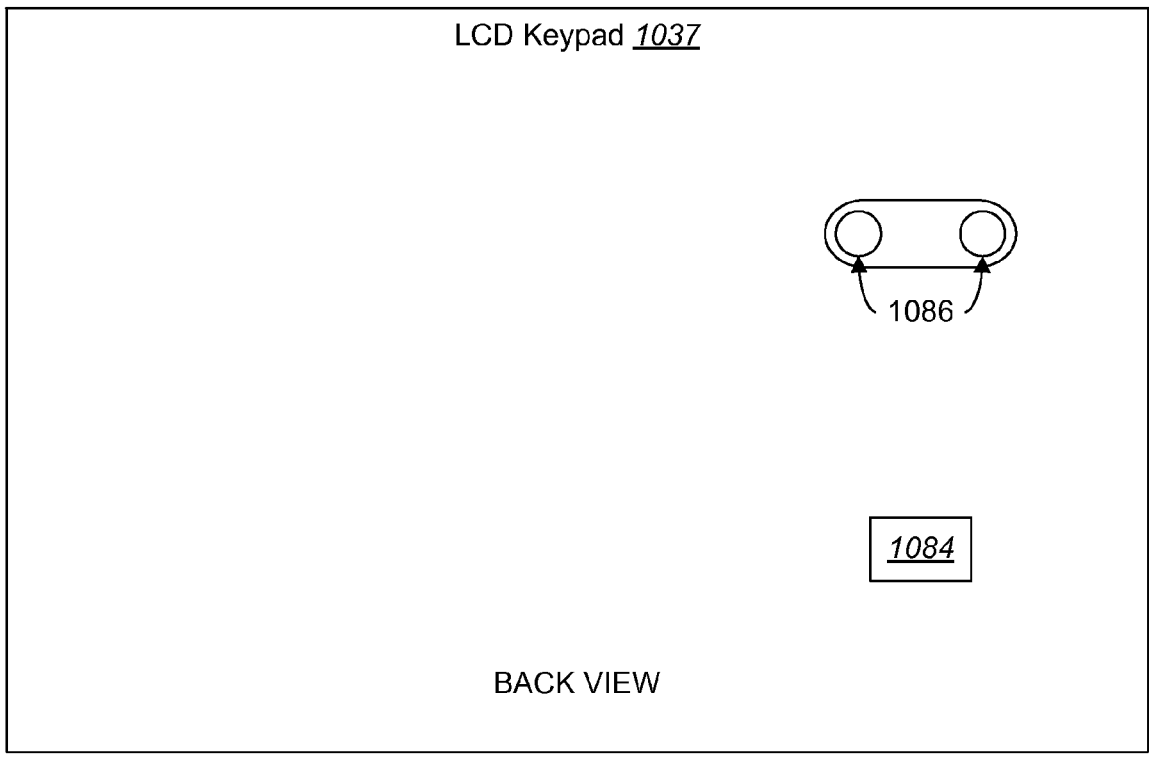

FIG. 11 is a block diagram illustrating the various features available on an exemplary LCD keypad 1037. The front and back of an embodiment of an LCD keypad 1037 are illustrated. The present embodiment may be incorporated into a wall mounted, a table top, or other configuration.

The LCD keypad 1037 may include I/O interfaces 869. In the present embodiment, the I/O interfaces 869 may include a display area 1072 and input controls 969d, such as a selection dial 1075 and/or a shortcut button 1071. The display area 1072 may include a color LCD screen. The display area 1072 may be used to display instant messaging information, such as presence information, etc. The selection dial 1075 may be used to identify the LCD keypad 1037 to the site controller 103. For example, when the LCD keypad 1037 is installed, the installer may press the selection dial 1075 to send a message to the site controller 103 indicating that the LCD keypad 1037 is connected to the site network 108. The selection dial 1075 may be used to scroll through user interfaces displayed in the display area 1072. For example, a user interface may present various options for selection in a circular menu, i.e. the selection dial 1075 may be used to cycle through the selections as the selection dial 1075 is rotated. The user may make a selection by pressing the selection dial 1075.

The LCD keypad 1037 may include a microphone 1090. The microphone 1090 may be used for intercom functions such as communicating over an intercom, recording audio, processing voice commands, monitoring a room, or other functions.

The LCD keypad 1037 may include a speaker 1049. The speaker 1049 may be used for intercom functions, such as communicating over an intercom. The speaker 1049 may be used to generate audio reports or other speaker functions.

The LCD keypad 1037 may include audio in ports 1086. The audio in ports 1086 may be used to connect an audio device to the LCD keypad 1037 to provide audio output through the speakers 1049 on the LCD keypad 1037. The LCD keypad 1037 may include an Ethernet connector 1084 for establishing an Ethernet connection 326 with the site controller 103. The LCD keypad 1037 may include a wireless transceiver 868. The wireless transceiver 868 may be used to send wireless signals over the site network 108. In the present embodiment, the wireless transceiver 868 may be used to send data over a ZigBee connection 328.

Figure 12:
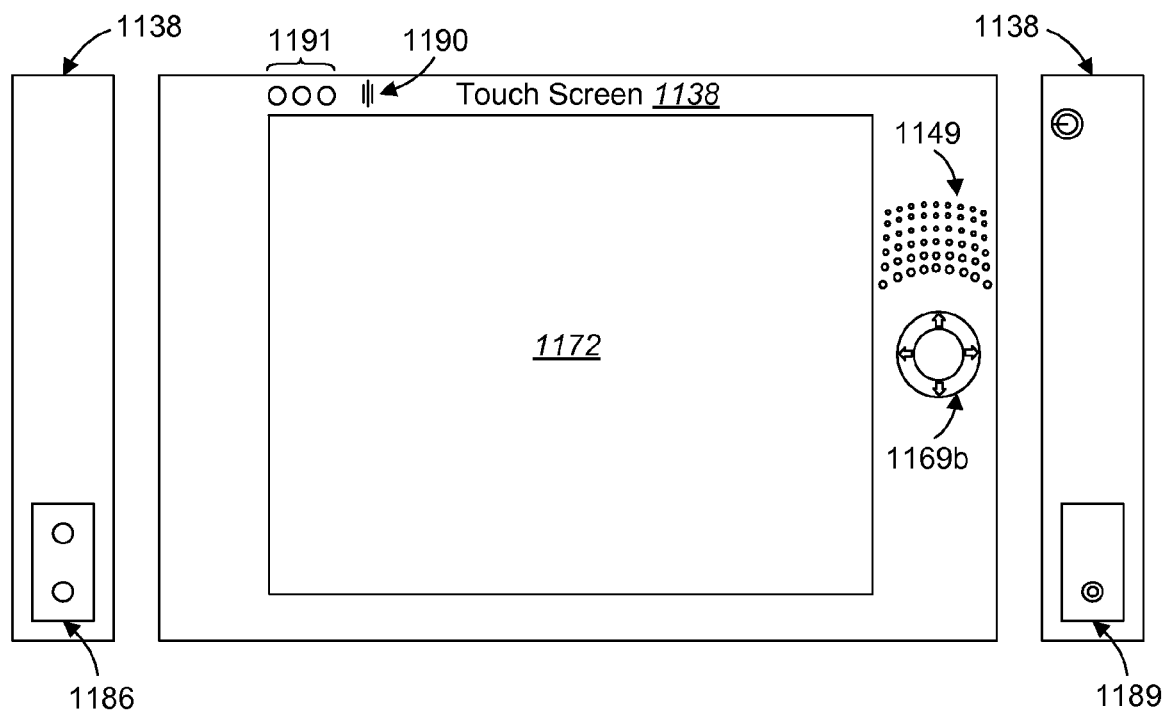
FIG. 12 is a block diagram illustrating the various features available on an exemplary mini touch screen.

FIG. 12 is a block diagram illustrating the various features available on an exemplary mini touch screen 1138. The mini touch screen 1138 may include a display area 1172. The display area 1172 may be used to display information. The display area 1172 may be used to display instant messaging information, such as presence information, etc. In the present embodiment, the display area 1172 may be a TFT or other touch screen. In embodiments where the display area 1172 is a touch screen, the display area 1172 may act as an input control 969d, such that it may be used to input data by touching the screen. No stylus is required in the present embodiment, though a stylus may be used.

The mini touch screen 1138 may include navigation controls 1169b. The navigation controls 1169b may include navigation buttons that allow a user to navigate through user interface menus. For example, navigation buttons may allow the user to select various options presented by the display area 1172.

The mini touch screen 1138 may include various LEDs 1191. The LEDs 1191 may show the status of the mini touch screen 1138. For example, the LEDs 1191 may include a power LED, which may indicate whether the mini touch screen 1138 is on, in stand-by, or off. The LEDs 1191 may include a battery charge LED, which may indicate the status of the battery (not shown), i.e., charging, charged, etc. The LEDs 1191 may include a signal strength LED, which may indicate the strength of a wireless connection (i.e., WiFi connection 327, ZigBee connection 328, etc.) between the mini touch screen 1138 and the site network 108.

The mini touch screen 1138 may include a microphone 1190. The microphone 1190 may be used for intercom functions such as communicating over an intercom, recording audio, processing voice commands, monitoring a room, or like functions. The mini touch screen 1138 may include a speaker 1149. The speaker 1149 may be used for intercom functions, such as communicating over an intercom. The speaker 1149 may be used to generate audio reports or other speaker functions.

The mini touch screen 1138 may include a wireless transceiver 868. The wireless transceiver 868 may be used to send wireless signals over the site network 108. In the present embodiment, the wireless transceiver 868 may be used to send data over a WiFi connection 327, a ZigBee connection 328, or other wireless connection.

The mini touch screen 1138 may include audio in/out ports 1186. In the present embodiment, the audio in/out ports 1186 may include a 3.5 mm earphone jack and a microphone jack. The mini touch screen 1138 may include a power input 1189. The power input 1189 may provide AC power to charge the battery on the mini touch screen 1138.

Figure 13:
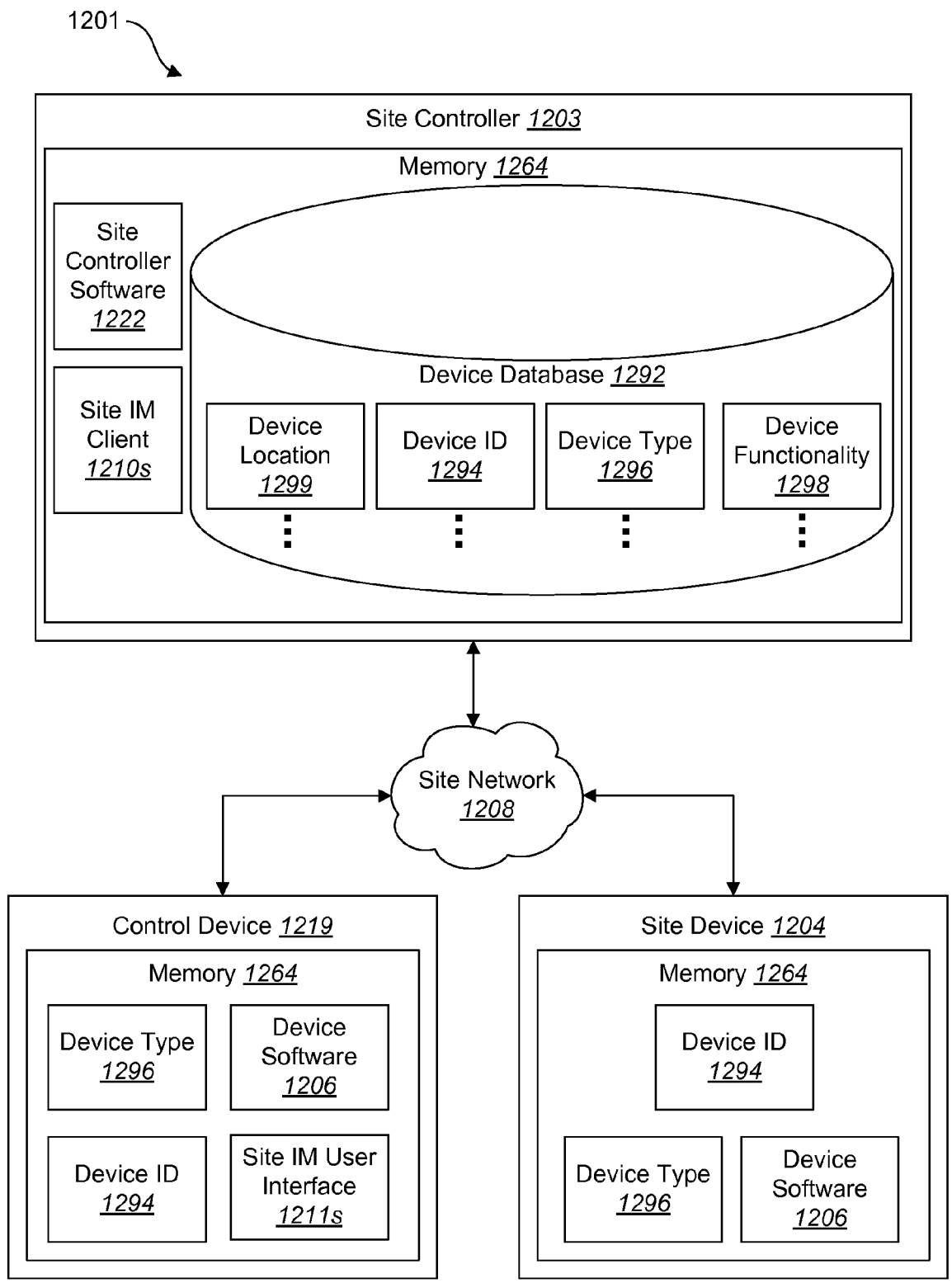
FIG. 13 is a functional block diagram illustrating a further embodiment of a system in which the present systems and methods may be implemented.

FIG. 13 is a functional block diagram illustrating a further embodiment of a site 1201 in which the present systems and methods may be implemented. The site 1201 may include a site controller 1203, a control device 1219, and another site device 1204 in electronic communication with the site controller 1203 via a site network 1208.

The site controller 1203 may include memory 1264. The memory 1264 may include site controller software 1222, a site IM client 1210s, and a device DB 1292. The device DB 1292 may include information regarding the site devices 1204 that have been registered with the site controller 1203. In the present embodiment, the site devices 1204 generally include control devices 1219; although site devices 104 other than the control devices 1219 may typically not have a site IM user interface 111s. The registration of site devices 104 is discussed in more detail in connection with FIG. 17. The device DB 1292 may include device locations 1299, device identifications (IDs) 1294, device types 1296, and device functionality 1298 for the site devices 1204 registered on the site controller 1203.

The device ID 1294 may be device specific, such that it is unique to the site devices 1204 registered with the site controller 1203. The device ID 1294 may be an identification that was associated with the device upon manufacture. The device ID 1294 may be an identification that is designated by a user or an installer. The device type 1296 may indicate what type of device a site device 1204 is; for example, whether the device is a contact relay extender 335, a switch/dimmer 333, an LCD keypad 337, or a site remote control 324. The device location 1299 may indicate the physical location of the site devices 1204; for example, in the living room 442, dining room 443, kitchen 444, den 445, or patio 446. The device functionality 1298 may indicate what hardware and software capabilities the site devices 1204 may have. For example, the device functionality 1298 may indicate that a control device 1219 does not have the hardware or software necessary to display video (i.e., the control device 1219 may not have a fast enough processor to process the video, the control device 1219 may not have a display area 972 capable of displaying video, the control device 1219 may not have a speaker 1049 to play the audio, etc.).

The device functionality 1298 may include information that may be used in determining whether a message should be forwarded to a control device 1219. For example, the device functionality 1298 may include a list of messages that indicates whether a message should be forwarded and/or whether the message should not be forwarded.

The device functionality 1298 may include device classes and/or service classes. Device classes may include the class of device. For example, the device class may indicate the functionality of the control device 1219, such as whether the control device 1219 is capable of displaying various types of messages. Service classes may include the class of services that may be processed by a control device 1219. Service classes may include an instant messaging service class. The instant messaging service class may be divided into varying levels, i.e. classes, of service. For example, instant messaging service classes may include minimal, normal, and premium service classes. The minimal instant messaging service class may only provide a minimum level of instant messaging services, i.e. may only provide a text message itself. The normal instant messaging service class may provide a standard level of instant messaging services, i.e. may provide the text message itself and other services such as including protocol elements.

The site controller software 1222 may be used to interface with the various connected site devices 1204. The site 1201 may include multiple control devices 1219 and other site devices 1204. The site devices 1204 may include in memory 1264 their respective device software 1206, device ID 1294, and device type 1296. The device software 1206 may be used to interface with the site controller 1203 and any connected devices. For example, if the site device 1204 were connected to a fireplace 557 (shown in FIG. 6), the device software 1206 may enable the site device 1204 to send and receive data from the site controller 1203 and to process the data, such as turning the fireplace 557 on or off based on the received data. The device software 1206 may enable a control device 1219 to send and receive data from the site controller 1203 and to process the data, such as displaying information on a display area 972 or sending messages to the site controller 1203 based on user input.

Figure 14:
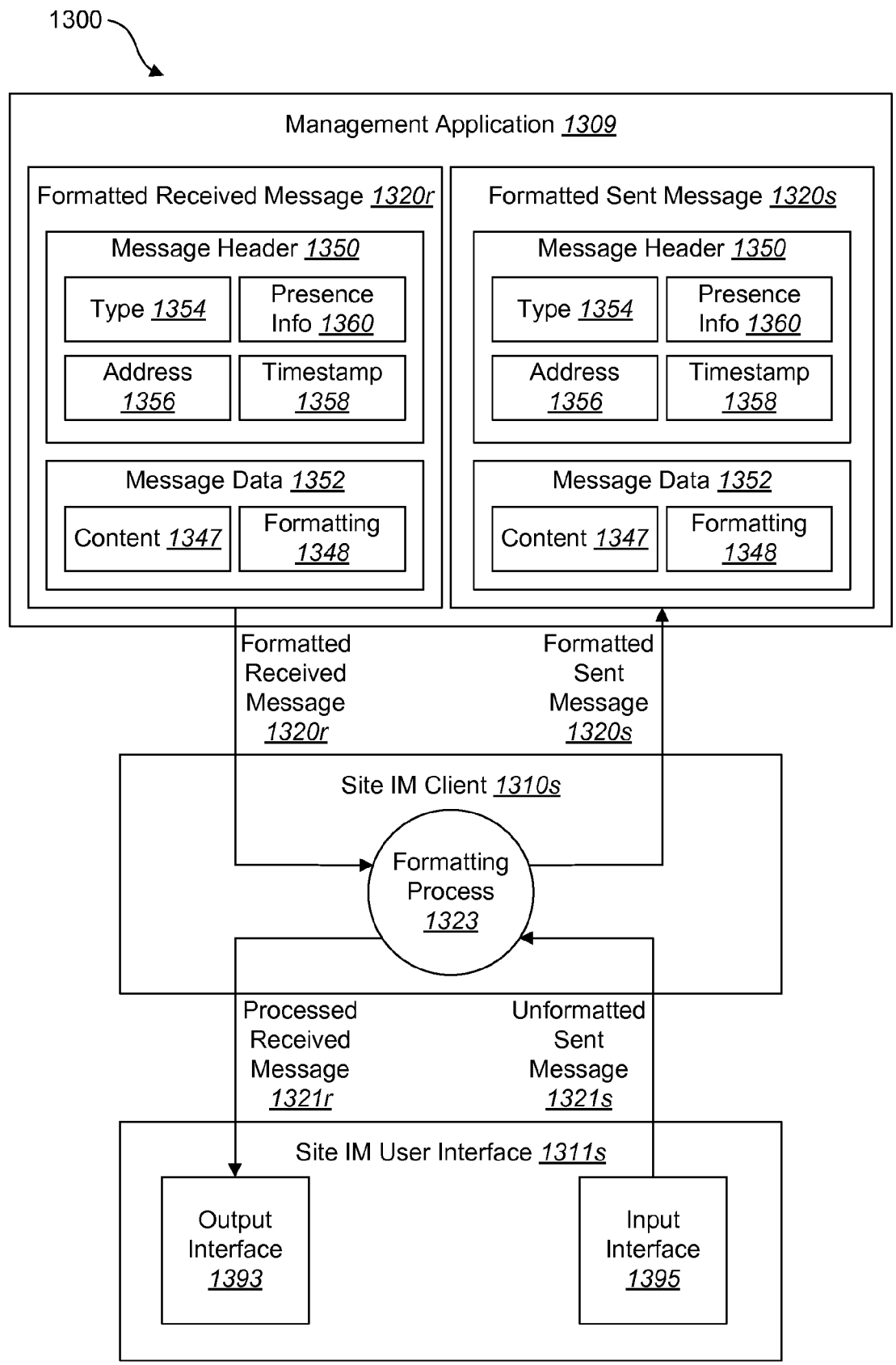
FIG. 14 is a functional block diagram illustrating a further embodiment of a system in which the present systems and methods may be implemented.

FIG. 14 is a functional block diagram illustrating a further embodiment of a system 1300 in which the present systems and methods may be implemented. The system 1300 may include a management application 1309, a site IM client 1310s, and a site IM user interface 1311s. The management application 1309, site IM client 1310s, and site IM user interface 1311s may be stored on their respective IM server 102, site controller 103, and control device 119.

The site IM client 1310s may receive formatted received messages 1320r and unformatted sent messages 1321s from the management application 1309 and the site IM user interface 1311s, respectively. The site IM client 1310s may process the formatted received messages 1320r from the management application 1309 and/or the unformatted sent messages 1321s from the site IM user interface 1311s using a formatting process 1323. The site IM client 1310s may send processed received messages 1321r to the site IM user interface 1311s and the formatted sent messages 1320s to the management application 1309.

The management application 1309 may be used to authenticate users, store contact lists, monitor presence information, send announcements of online contacts from a contact list, and other IM functions. Instant messages from site IM clients 110s and other IM clients 110 may be forwarded by the management application 1309. In FIG. 14, the management application 1309 is illustrated from the perspective of a site IM client 1310s.

The management application 1309 may receive the formatted received messages 1320r from another IM client 110 (including another site IM client 110s). The formatted received messages 1320r may include a message header 1350 and message data 1352. The management application 1309 may receive a formatted sent message 1320s from another IM client 110. The formatted sent messages 1320s may include a message header 1350 and message data 1352. Generally, the formatted received and sent messages 1320r, 1320s may include similar types of information. However, in other embodiments, the formatted received and sent messages 1320r, 1320s may include different types of information.

In the present embodiment, the formatted messages 1320r, 1320s may include a message header 1350 and message data 1352. In some embodiments, the formatted messages 1320r, 1320s may be text based messages. In other embodiments, the formatted messages 1320r, 1320s may include video, picture, audio, or other data.

The message header 1350 may include a message type 1354, a message address 1356, a message timestamp 1358, and/or presence information 1360. The message type 1354 may indicate whether the formatted message 1320r, 1320s include text, video, picture, audio, or other data. The message address 1356 may include the address of the intended recipient of the message. For example, the message address 1356 may include the IP address and port on which the IM client 110 or site IM client 110s may be listening for incoming data from the management application 1309. The message address 1356 may include any form of address information.

The message timestamp 1358 may include the time that the formatted message 1320r, 1320s was sent from the originating IM device 105. For example, the IM client 110 (or site IM client 110s) from which the formatted message 1320r, 1320s was sent may store the time and/or date that the formatted message 1320r, 1320s was sent. In another example, the site IM client 1310s may store the time and date that an unformatted sent message 1321s was received from the site IM user interface 1311s. The presence information 1360 may include the user's presence. For example, the presence information 1360 may include data, such as a presence indicator, indicating whether a user is online, offline, away, busy, etc. The presence information 1360 may include presence and/or discovery protocols. In some embodiments, the presence information 1360 may be sent without message data 1352.

The message data 1352 may include message content 1347 and message formatting 1348. The message content 1347 may include the text of a message. In other embodiments, the message content 1347 may include other content, such as video, pictures, audio, or other content. The message formatting 1348 may include text formatting, such as fonts, colors, bold, italics, underline, spacing, and/or other formatting.

The site IM user interface 1311s may include an output interface 1393 and an input interface 1395. The output interface 1393 and the input interface 1395 may interact with an I/O interface 869 on the control device 119.

For example, the output interface 1393 may be instructed by the site IM user interface 1311s to display data on a display area 972 and/or to generate audio data on a speaker 1049. The display area 972, in the present embodiment, may include a backlit LCD screen, a color LCD screen, a TFT touch screen, or other display area. In another example, the output interface 1393 may receive a processed received message 1321r from the site IM client 1310s and may be instructed to display the processed received message 1321r on the display area 972. In some embodiments, the output interface 1393 may display information on the display area 972 of the control device 119 via a user interface. The user interface may be a graphical user interface or a text based user interface. The user interface may enable a user to prepare messages using the resources available on a control device 119.

The input interface 1395 may receive data from an I/O interface 869 via various inputs, which may include buttons or controls, such as selection dials or other inputs, and process the received data. Processing the received data may include sending the data to the site IM client 1310s as an unformatted sent message 1321s.

The site IM client 1310s may receive the unformatted sent message 1321s and/or the formatted received messages 1320r. The site IM client 1310s may process the formatted received messages 1320r and the unformatted sent messages 1321s using a formatting process 1323. The formatting process 1323 may change, add, and/or remove information and data to and/or from formatted messages 1320r, 1320s.

For example, the formatting process 1323 may change and/or remove portions of the message header 1350 and portions of the message data 1352 from a formatted received message 1320r. In another example, the formatting process 1323 may change and/or add a message header 1350 and portions of the message data 1352 to an unformatted sent message 1321s. The formatting process 1323 may change, remove, and/or add the message type 1354, the message address 1356, presence information 1360, or the timestamp 1358 to and/or from the formatted received message 1320r and/or unformatted sent message 1321s respectively. The formatting process 1323 may change, remove, and/or add message content 1347 or message formatting 1348 to the formatted received message 1320r and/or unformatted sent message 1321s respectively.

Figure 15:
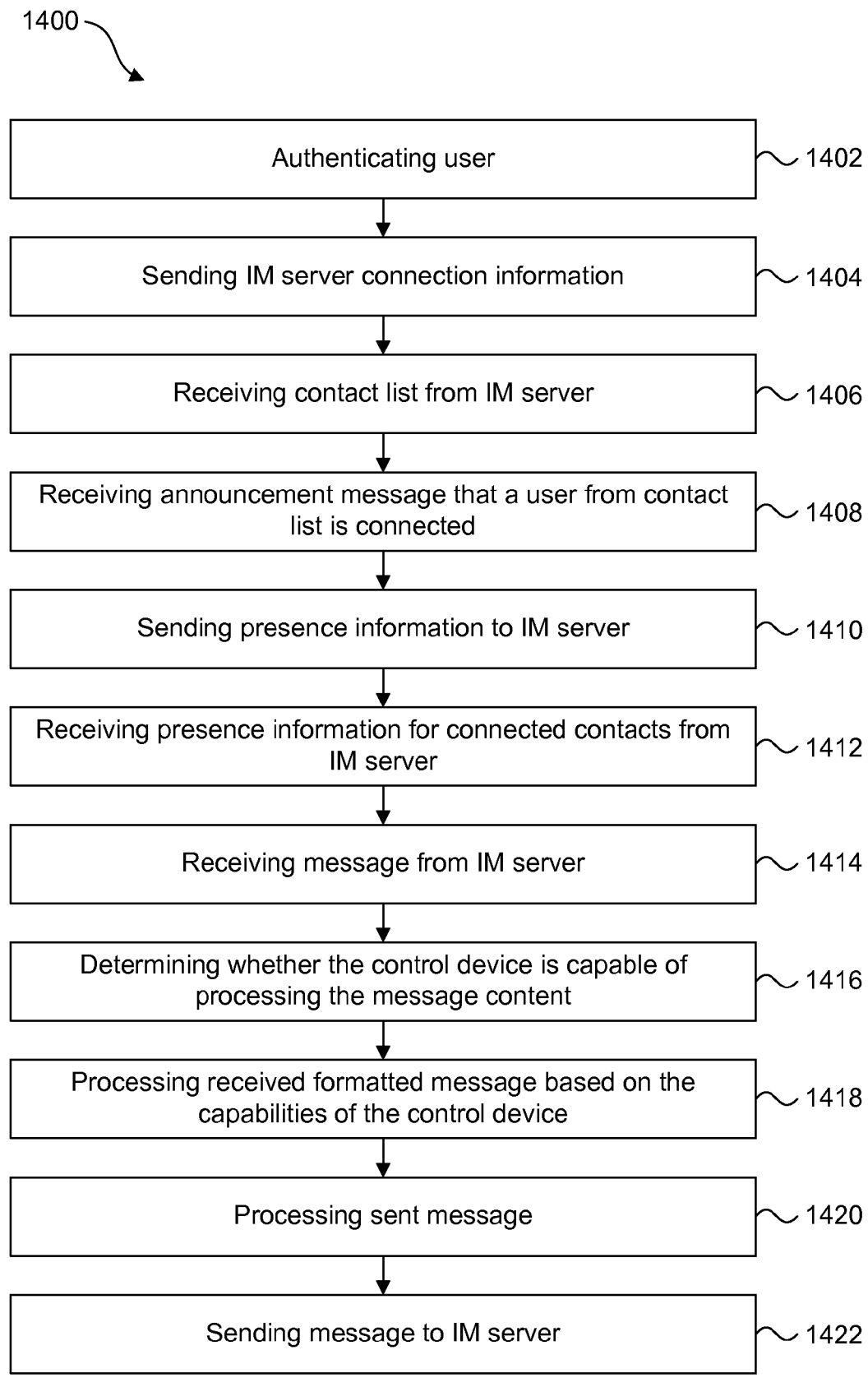
FIG. 15 is a flow diagram of an embodiment of a method for instant messaging using a control device.

FIG. 15 is a flow diagram of an embodiment of a method 1400 for instant messaging using a control device 119. The method 1400 may include authenticating 1402 the user. Authenticating 1402 the user may include the site controller 103 connecting to the IM server 102. The IM server 102 may send an authentication request (for example, a login and password) to the site controller 103. The site controller 103 may send the authentication request to the control device 119. The user may use inputs from the I/O interface 869 on the control device 119 to respond to the authentication request. For example, the user may use the navigation controls 969b on a site remote control 324 or mini touch screen 338 or the selection dial 1075 on an LCD keypad 337 in combination with the display area 772 on the control device 119 to enter a username and password to send an authentication response to the site controller 103. The site controller 103 may forward the authentication response to the IM server 102. Other methods for authenticating 1402 the user may also be used.

The IM server 102 may be sent 1404 connection information from the site controller 103. Connection information may include information that may be necessary to route messages to the site controller 103. For example, the connection information may include the IP address and port on which the site controller 103 may be listening for incoming messages.

A contact list may be received 1406 from the IM server 102. Receiving 1406 the contact list may include processing the contact list such that it may be displayed on the control device 119. In the present embodiment, the contact list is not stored locally (i.e., not on the site controller 103 or control devices 119). In other embodiments, the contact list may be stored locally, such that the contact list may not need to be received 1406 from the IM server 102.

An announcement message, which indicates that a user from the contact list is connected to the IM server 102, may be received 1408. The announcement message may be received 1408 from the IM server 102 by the site controller 103. The site controller 103 may process the announcement message such that it may be output to the control device 119. For example, the site controller 103 may change or remove any data or information from the announcement message that may not be compatible with the control device 119 (i.e. cannot be displayed by the display area 772 or generated by the speaker 1049).

Presence information 1360 may be sent 1410 to the IM server 102. In the present embodiment, the site controller 103 may send the presence information 1360 to the IM server 102. The presence information 1360 may indicate whether a user is online, offline, away, busy, etc.

The IM server 102 may receive 1412 the presence information 1360 for connected contacts from the user's contact list. Receiving 1412 the presence information 1360 may include receiving the presence information 1360 on the site controller 103 and/or processing the presence information 1360 such that it may be output to the control device 119. For example, the site controller 103 may change or remove any data or information from the presence information 1360 that may not be compatible with the control device 119. A message from the IM server 102 may be received 1414 by the site controller 103. The received message may be a formatted received message 1320r.

The site controller 103 may determine 1416 whether the control device 119 is capable of processing the message content 1347. In some embodiments, the control device 119 may not have the functionality to process announcement messages, presence information 1360, contact lists, authentication requests, formatted received messages 1320r, and other data or information sent by the IM server 102. A lack of capability to process message content 1347 may mean that the control device 119 may not have the functionality to output (i.e., display or generate) certain data or information using the I/O interfaces 869 on the control device 119. For example, the I/O interfaces 869 may include a display area 772 and/or a speaker 1049 which may not be capable of displaying or generating the data or information. In some embodiments, this determination 1416 may be automatic (i.e., without requiring user input).

The site controller 103 may make this determination 1416 by querying the device DB 1292 to determine if the control device 119 is capable of processing the message content 1347 based on the device functionality field 1298. For example, if the control device 119 were an embodiment of a site remote control 324 that only has a simple backlit LCD screen for a display area 772 and did not have a speaker 1049, the device functionality field 1298 may indicate that the control device 119 does not have the capability to process video, audio, color images, or other message content 1347 that may require a speaker 1049 and/or more than a simple backlit LCD screen for a display area 772.

The site controller 103 may process 1418 formatted received messages 1320r based on the capabilities of the control device 119. For example, if the site controller 103 determines 1416 that the control device 119 is not capable of displaying color images, the site controller 103 may process 1418 the color images by converting the color images to grayscale or may simply remove the color images from the message content 1347 and replace the images with, for example, a notification that an image was a part of the message content 1347. In another example, if the site controller 103 determines 1416 that the control device 119 is not capable of displaying certain types of message formatting 1348 (i.e., the control device 119 may not be capable of displaying underlining or color fonts), the site controller 103 may remove or change the message formatting 1348 so that the message content 1347 may be output correctly.

The site controller 103 may process 1420 an unformatted sent message 1321*s*. In the present embodiment, the unformatted sent message 1321*s* may be a simple text message, such that the unformatted sent message 1321*s* may not include a detailed message header 1350, but rather may simply include, as message content 1347, the text input by the user. For example, in some embodiments, unformatted sent messages 1321*s* may not contain all of the information and data required by the management application 1309 to forward the message to the desired recipient. The lack of all the required information may be due to limited device functionality. The required information may include a message header 1350 with information such as the message type 1354, the message address 1356, the message timestamp 1358, and/or the presence information 1360. In some embodiments, the unformatted sent messages 1321*s* may not be properly formatted for the protocols required by the IM server 102. For example, an unformatted sent message 1321*s* may contain abbreviations, shortcuts, or other symbols indicating content stored on the site controller 103 but not stored on the control device 119, which a user may wish to include in the message content 1347. For example, an unformatted sent message 1321*s* may include a path and filename of a video, picture, or other content stored on the site controller 103. In another example, the unformatted sent message 1321*s* may not contain a properly formatted message address 1356, may not contain a timestamp 1358, or other information that may be required by the IM server 102.

Processing 1420 the unformatted sent message 1321*s* may be accomplished using the formatting process 1323 on the site IM client 1310*s*. The formatting process 1323 may change and/or add information and data to the unformatted sent message 1321*s*. For example, the formatting process 1323 may change and/or add a message header 1350 and message data 1352 in an unformatted sent message 1321*s*. The formatting process 1323 may change and/or add the message type 1354, the message address 1356, presence information 1360, or a timestamp 1358 to the unformatted sent message 1321*s*. The formatting process 1323 may change and/or add message content 1347 or message formatting 1348 to the unformatted sent message 1321*s*. For example, because of the limited functionality of a control device 119 (i.e., the size of the display area 772, the limited nature of the I/O interfaces 869, or other control device 119 limitations) the user may not be able to easily input the message address 1356, add video, audio, picture, or other message content 1347 other than simple text, directly add message formatting 1348 to the message content 1347, or other message functions.

The site controller 103 may send 1422 the formatted sent message 1320*s* to the IM server 102. The formatted sent message 1320*s* may be sent 1422 via the IM network 107. The site IM client 110*s* may send the formatted sent message 1320*s* to the management application 109 on the IM server 102, which may receive and store the formatted sent message 1320*s*.

Figure 16:
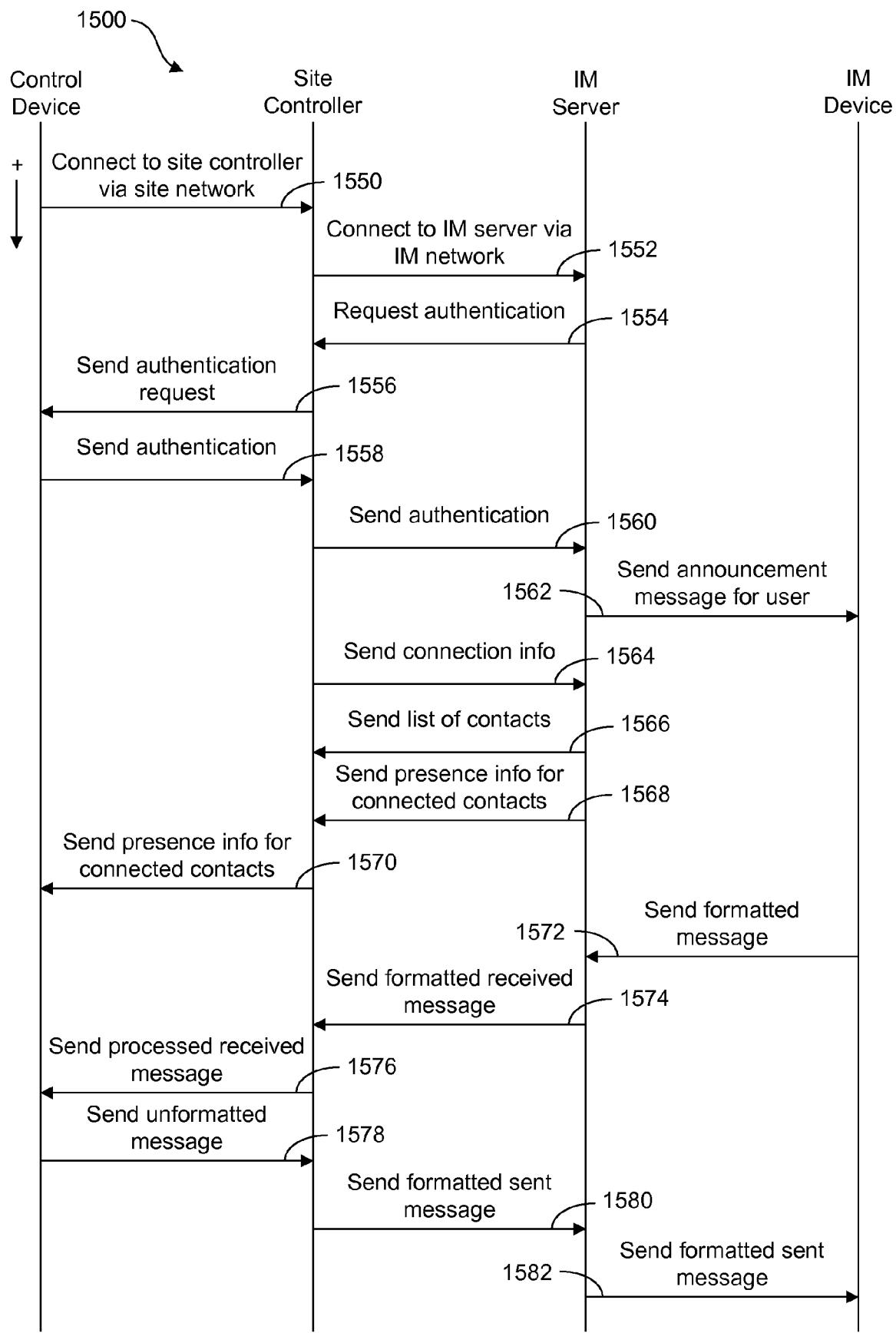
FIG. 16 is a thread diagram illustrating an embodiment of a system for instant messaging using a control device.

FIG. 16 is a thread diagram illustrating an embodiment of a system 1500 for instant messaging using a control device 119. The system 1500 may include a control device 119, a site controller 103, an IM server 102, and an IM device 105. The IM device 105 may include another site controller 103 and control device 119. The IM device 105 may be in electronic communication with the IM server 102 via the IM network 107. The control device 119 may connect 1550 to the site controller 103 via the site network 108. The site controller 103 may connect 1552 to the IM server 102 via the IM network 107.

The IM server 102 may request 1554 authentication from the site controller 103. The site controller 103 may send 1556 the authentication request to the control device 119. Sending 1556 the authentication request to the control device 119 may include processing the authentication request such that the authentication request may be displayed in the display area 772 of the control device 119 and such that the user may respond to the authentication request.

The authentication may be sent 1558 from the control device 119 to the site controller 103. The authentication may include the username and password of the user. The site controller 103 may send the authentication to the IM server 102. The authentication sent 1558 by the control device 119 to the site controller 103 may be processed by the site controller 103 to give the authentication the proper formatting to send 1560 the authentication to the IM server 102.

The IM server 102 may process the authentication to determine whether the authentication is proper. The IM server 102 may send 1562 an announcement message to the IM device 105. The announcement message may indicate that the user is connected to the IM server 102. The site controller 103 may send 1564 connection information for the site IM client 110*s* to the management application 109 on the IM server 102.

The IM server 102 may send 1566 the user's list of contacts to the site controller 103. The site controller 103 may process the list of contacts such that the user may view the list and select a recipient for a message. The IM server 102 may send 1568 the presence information 1360 for any contacts from the user's contact list that are connected to the IM server 102 to the site controller 103. The site controller 103 may send 1570 the presence information 1360 for any connected contacts to the control device 119. The site controller 103 may process the presence information 1360 before sending 1570 the presence information 1360 to the control device 119 to enable the presence information 1360 to be output by the control device 119.

The IM device 105 may send 1572 a formatted message 1320*r* to the IM server 102. The IM server 102 may receive and store the formatted received message 1320*r* from the IM device 105. The IM server 102 may send 1574 the formatted received message 1320*r* to the site controller 103. The site controller 103 may process 1418 the formatted received message 1320*r*. The site controller 103 may send 1576 the processed received message 1321*r* to the control device 119.

The user may prepare an unformatted message 1321*s*. The unformatted message 1321*s* may be sent 1578 to the site controller 103. The site controller 103 may process 1420 the unformatted sent message 1321*s* such that the unformatted sent message 1321*s* may become a formatted sent message 1320*s* capable of being received by the IM server 102. The site controller 103 may send 1580 the formatted sent message 1320*s* to the IM server 102. The IM server 102 may send 1582 the formatted sent message 1320*s* to the IM device 105.

Figure 17:
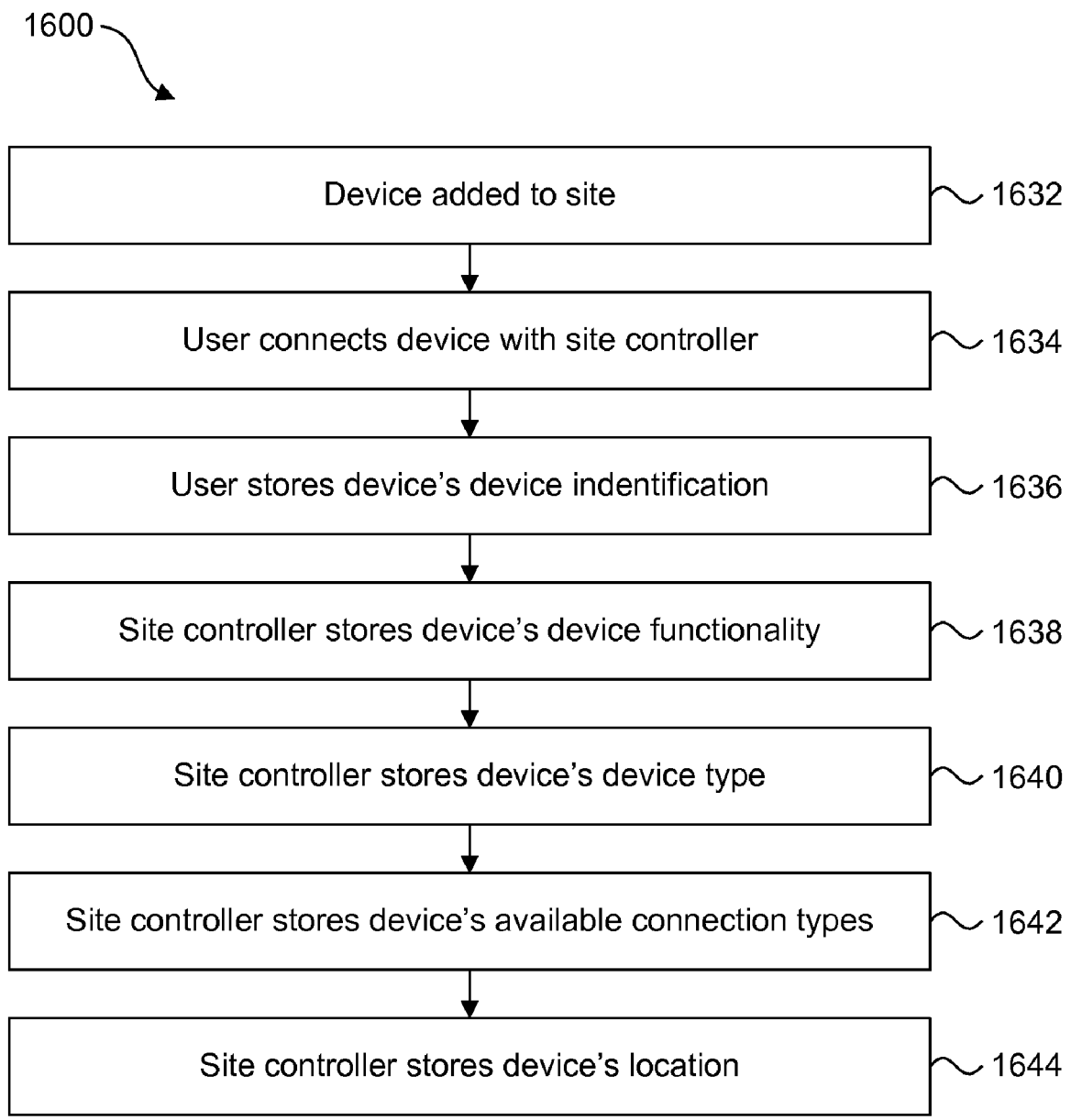
FIG. 17 is a flow diagram of an embodiment of a method for registering embedded devices at a site.

FIG. 17 is a flow diagram of an embodiment of a method 1600 for registering site devices 104 at a site 101. A site device 104 may be added 1632 to the site 101. For example, a switch/dimmer 333 may be installed in a home or a thermostat 332 may be installed in an office building. In another example, a site remote control 324 or LCD keypad 337 may be installed in a home or office. For site devices 104 that are capable of communication over an Ethernet connection 326, adding 1632 a device to a site 101 may include connecting the device over an Ethernet connection 326. The user may connect 1634 the device with the site controller 103. Connecting 1634 the device with the site controller 103 may include turning on the device to enable wired or wireless communication with the site controller 103.

The user may store 1636 the device ID 1294 for the site device 104 on the site controller 103 by accessing the site controller 103. For example, the device ID 1294 may be stored in the device DB 1292 on the site controller 103. The site controller 103 may store 1638 the device functionality 1298 of the site device 104. For example, the device functionality 1298 may be stored in the device DB 1292 on the site controller 103. The site controller 103 may store 1640 the device type 1296 for the site device 104 on the site controller 103 (e.g., in the device DB 1292 on the site controller 103). The site controller 103 may store 1642 the connection types available for the site device 104 on the site controller 103. For example, if the site device 104 is capable only of an Ethernet connection 326 and a ZigBee connection 328, this may be stored 1642 on the site controller 103. The site controller 103 may store 1644 the location 1299 of the site device 104. For example, the device location 1299 may indicate if the site device 104 is located in the living room 442, dining room 443, kitchen 444, den 445, or on the patio 446, etc. The device ID 1294, device type 1296, available connection types (i.e., an Ethernet connection 326, a WiFi connection 327, a ZigBee connection 328, or other connection types), and device location 1299 may be stored 1636, 1638, 1640, 1642, 1644 in the device DB 1292 on the site controller 103.

In another embodiment, the site controller 103 may determine and store the device ID 1294, device type 1296, device functionality 1298, available connection types, or device location 1299 without user input. For example, the site controller 103 may attempt to determine the available connection types by pinging the site device 104, the device location 1299 by comparing the device's response time to requests, the device type 1296 or device functionality 1298 by attempting to perform functions typically performed by the various device types 1296, etc.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for instant messaging using a control device, comprising:
   authenticating a user with an instant messenger server;
   receiving a message comprising message data from the instant messenger server;
   determining whether the message should be forwarded to the control device; and
   forwarding the message to the control device, if it was determined that the message should be forwarded to the control device.

2. The method of claim 1, wherein determining whether the message should be forwarded to the control device comprises comparing the message with a list of messages that are to be forwarded.

3. The method of claim 1, wherein determining whether the message should be forwarded to the control device comprises comparing the message with a list of messages that are not to be forwarded.

4. The method of claim 1, wherein determining whether the message should be forwarded to the control device comprises querying a device database based on a specific type of device.

5. The method of claim 1, wherein determining whether the message should be forwarded to the control device comprises querying a device database based on a specific device class.

6. The method of claim 1, wherein determining whether the message should be forwarded to the control device comprises querying a device database based on a specific service class.

7. The method of claim 1, further comprising specifying a service class for an instant messenger service.

8. The method of claim 1, wherein determining whether the message should be forwarded to the control device is performed without user input.

9. The method of claim 1, wherein determining whether the message should be forwarded to the control device is performed without user input, and wherein the message comprises a protocol message indicating presence.

10. The method of claim 1, further comprising processing the received message before forwarding the message to the device.

11. The method of claim 10, wherein the message data includes message formatting and wherein processing the received message comprises removing the message formatting from the message data.

12. A computer system that is configured for instant messaging using a control device, the computer system comprising:
   a control device, wherein the control device is in electronic communication with the site controller; and
   a site controller comprising:
      a processor;
      memory in electronic communication with the processor;
      instructions stored in the memory, the instructions being executable to:
         authenticate a user with an instant messenger server;
         receive a message from the instant messenger server;
         determine whether the message should be forwarded to the control device; and
         forward the message to the control device, if it was determined that the message should be forwarded to the control device.

13. The system of claim 12, further comprising a list of messages that are to be forwarded stored in the memory, and wherein the determining instructions compare the message with the list of messages that are to be forwarded.

14. The system of claim 12, further comprising a list of messages that are not to be forwarded stored in the memory, and wherein the determining instructions compare the message with the list of messages that are not to be forwarded.

15. The system of claim 12, further comprising a device database stored in the memory, and wherein the determining instructions query the device database.

16. The system of claim 12, wherein the determining instructions query a device database.

17. The system of claim 12, wherein the control device comprises a television remote control.

18. The system of claim 12, wherein the control device comprises an LCD keypad.

19. The system of claim 18, wherein the message comprises a protocol message indicating presence, and wherein a presence indicator is displayed on the LCD keypad.

20. The system of claim 12, wherein the site controller does not require a keyboard or a mouse for standard operation.

21. The system of claim 12, wherein the site controller comprises an embedded system that includes built-in audio ports, built-in video ports, and built-in infrared in and out ports, and wherein the site controller does not require an external exclusive computer monitor for standard operation.

22. A computer-readable medium comprising executable instructions to enable instant messaging using a control device, the instructions being executable to:
   authenticate a user with an instant messenger server;
   receive a message from the instant messenger server;
   determine whether the message should be forwarded to the control device; and
   forward the message to the control device, if it was determined that the message should be forwarded to the control device.

23. The computer-readable medium of claim 22, wherein determining whether the message should be forwarded to the control device is performed without user input.

24. The computer-readable medium of claim 22, wherein determining whether the message should be forwarded to the control device is performed without user input, and wherein the message comprises a protocol message indicating presence.

* * * * *

UNITED STATES PATENT AND TRADEMARK OFFICE
CERTIFICATE OF CORRECTION

| | | |
|---|---|---|
| PATENT NO. | : 7,738,870 B2 | Page 1 of 1 |
| APPLICATION NO. | : 11/626788 | |
| DATED | : June 15, 2010 | |
| INVENTOR(S) | : Michael L. Howard | |

It is certified that error appears in the above-identified patent and that said Letters Patent is hereby corrected as shown below:

In column 1, line 26 please delete "modem" and replace it with --modern--.

Signed and Sealed this

Fifth Day of October, 2010

David J. Kappos
*Director of the United States Patent and Trademark Office*